US010608490B2

(12) United States Patent
Woolmer et al.

(10) Patent No.: US 10,608,490 B2
(45) Date of Patent: Mar. 31, 2020

(54) AXIAL FLUX MACHINE

(71) Applicant: YASA LIMITED, Yarnton, Oxfordshire (GB)

(72) Inventors: Tim Woolmer, Wheatley (GB); Christopher Thomas McCaw, Abingdon (GB); Andrew Court, Bicester (GB)

(73) Assignee: YASA LIMITED, Yarnton (GB)

( * ) Notice: Subject to any disclaimer, the term of this patent is extended or adjusted under 35 U.S.C. 154(b) by 396 days.

(21) Appl. No.: 15/295,239

(22) Filed: Oct. 17, 2016

(65) Prior Publication Data
US 2017/0117763 A1 Apr. 27, 2017

(30) Foreign Application Priority Data

Oct. 16, 2015 (GB) .................................. 1518387.4

(51) Int. Cl.
H02K 1/27 (2006.01)
H02K 7/00 (2006.01)
H02K 15/16 (2006.01)
H02K 21/24 (2006.01)
H02K 1/14 (2006.01)
(Continued)

(52) U.S. Cl.
CPC .......... *H02K 1/2793* (2013.01); *H02K 1/146* (2013.01); *H02K 5/161* (2013.01); *H02K 7/006* (2013.01); *H02K 7/083* (2013.01); *H02K 15/03* (2013.01); *H02K 15/16* (2013.01); *H02K 21/24* (2013.01); *H02K 2201/03* (2013.01)

(58) Field of Classification Search
CPC ...... H02K 1/2793; H02K 1/146; H02K 5/161; H02K 7/006; H02K 7/083; H02K 15/03; H02K 15/16; H02K 21/24; H02K 2201/03

USPC .................................................... 310/156.37
See application file for complete search history.

(56) References Cited

U.S. PATENT DOCUMENTS 4,866,323 A 9/1989 Oudet et al.
8,115,364 B2 * 2/2012 Minowa ................. H02K 16/00
310/114
(Continued)

FOREIGN PATENT DOCUMENTS

CN 2218989 Y 1/1996
GB 2192313 1/1988
(Continued)

OTHER PUBLICATIONS

Office Action issued in corresponding GB Application 1617569.9, dated Apr. 10, 2017.
(Continued)

*Primary Examiner* — Forrest M Phillips
(74) *Attorney, Agent, or Firm* — Meunier Carlin & Curfman LLC

(57) ABSTRACT

A double-rotor single stator axial flux machine, which is supplied having no bearings between the rotors and stator internal of the machine, is mounted to an external structure such as an interface of an engine of a vehicle or a portion of the transmission of a vehicle. The machine is mounted to the structure via the shaft of the machine (on which are seated bearings located in the structure) and the stator housing. The bearings of the structure, which are external to the machine, permit the rotors to rotate relative to the stator when the machine is installed on the structure.

58 Claims, 18 Drawing Sheets

(51) Int. Cl.
*H02K 5/16* (2006.01)
*H02K 7/08* (2006.01)
*H02K 15/03* (2006.01)

(56) References Cited

U.S. PATENT DOCUMENTS

| | | | | |
|---|---|---|---|---|
| 9,882,442 B2* | 1/2018 | Sakamoto | ............ | H02K 1/2793 |
| 2004/0090140 A1* | 5/2004 | Lai | ............ | H02K 1/2793 |
| | | | | 310/268 |
| 2011/0309694 A1* | 12/2011 | Woolmer | ............ | H02K 21/24 |
| | | | | 310/44 |
| 2015/0084446 A1* | 3/2015 | Atar | ............ | H02K 16/00 |
| | | | | 310/43 |

FOREIGN PATENT DOCUMENTS

| | | |
|---|---|---|
| GB | 2490972 | 11/2012 |
| WO | 2015155879 | 10/2015 |

OTHER PUBLICATIONS

Search Report conducted in GB Application No. 1518387.4 dated Apr. 18, 2016.
Office Action in connection with Application No. GB1721026.1, dated Jul. 25, 2019.

* cited by examiner

AXIAL FLUX MACHINE

FIELD OF THE INVENTION

The present invention relates to an axial flux machine, in particular a method of pre-assembly for shipment and subsequent assembly into another machine.

BACKGROUND OF THE INVENTION

In the present invention, we are concerned with axial flux permanent magnet machines. Broadly speaking these have disc- or ring-shaped rotor and stator structures arranged about an axis. Typically the stator comprises a set of coils each parallel to the axis and the rotor bears a set of permanent magnets and is mounted on a bearing so that it can rotate about the axis driven by fields from the stator coils. FIG. 1a shows the general configuration of an axial flux machine of the present invention with a pair of rotors R1, R2 to either side of a stator S—although a simple structure of the present invention could omit one of the rotors. As can be seen there is an air gap G between a rotor and a stator and in an axial flux machine the direction of flux through the air gap is substantially axial.

There are various configurations of axial flux permanent magnet machine depending upon the arrangement of north and south poles on the rotors. FIG. 1b illustrates the basic configurations of a Torus NS machine, a Torus NN machine (which has a thicker yoke because the NN pole arrangement requires flux to flow through the thickness of the yoke), and a YASA (Yokeless and Segmented Armature) topology. The illustration of the YASA topology shows cross-sections through two coils, the cross-hatched area showing the windings around each coil. As can be appreciated, dispensing with the stator yoke provides a substantial saving in weight and iron losses, but one drawback is loss of rigid structure in which a bearing can be mounted to support rotors. Thus preferably for a YASA topology of double rotor, single stator axial flux motor a bearing is mounted within the stator confines and magnetic forces from rotors on either side of the stator are axially balanced. Rotors being designed to resist bending towards the stator.

For such motors, the air gap between rotor and stator for axial flux motors is small typically of the order of 1 mm. Smaller gaps lead to higher motor torque and power output and is seen as beneficial.

However as said rotor to stator air gap becomes smaller so manufacturing stack-up tolerances derived from stator and rotor components can lead to variable air gap from motor to motor and hence variable output characteristics. In the limit there is possibility of interference of rotor on stator and hence rotor not being able to rotate and a motor being inoperable or catastrophic motor failure if interference occurs during use.

To overcome the problem of stack-up tolerance for double rotor, single stator, axial flux motors, WO 2010/092402 teaches a two stage rotor arranged one at either end of the stator bars, with two air gaps between the ends of the bars and the rotor stages, an annular housing retaining and mounting the stator; a bearing between the rotor and stator. The rotor is thus not otherwise supported in or on the housing and air gaps are set by stator width, bearing length and bearing support faces on rotors. This arrangement provides excellent repeatability of the air gap in motor production, but the teaching of WO 2010/092402 does not apply if a bearing is not placed between stator and rotor but instead bearings are supplied by adjacent machines as is the case for many machine tools and hybrid designs. It is always preferable for multiple connected rotating machines to be correctly aligned, but axial flux motors are particularly sensitive to axial misalignment and/or displacement of rotor to stator which affect's airgaps and so efficiency and in the limit may prevent rotation or cause catastrophic failure.

A frameless torque motor is described by Vogt US 2006/0145566 for securing the position of a radial motor rotor relative to the stator, in which a spacer is included in the air gap. However does not address the issue of how stator to rotor axial alignment is achieved when said torque motor is integrated in to another machine. A possible reason for this is that axial misalignment of a radial flux rotor with its stator minimally affects motor operation whereas axial misalignment of an axial flux motor is of great significance in the limit preventing motor operation or leading to catastrophic failure.

Nielson U.S. Pat. No. 3,719,988 teaches spacer elements for centering of rotors within stators for radial machines when in manufacture or in repair. Centering spacer elements enable fixing of the rotor shaft into bearings within the motor housing. Because motor bearings are not available in axial flux machines, this significantly increases the complexity of alignment.

Oudet in U.S. Pat. No. 5,003,686 teaches the use of spacers in a double stator, single rotor, axial flux electric motor in which spacers are used to separate a rotor part from first and second stator parts. With the rotor part correctly in position the rotor part is stuck (adhesively) or fixed by another means to the main rotor assembly and the stator is similarly fixed in position. This arrangement works for an internally journaled rotor, but does not address adjustment of stator around a fixed rotor and does not solve rotor and stator positioning for an externally journaled rotor shaft. Thus Oudet teaches rough axial placement of the rotor shaft and rotor support using a circlip and shims and fine alignment by sandwiching the rotor part between stator parts, keeping an air gap using two spacers and fixing or (adhesively) sticking rotor and stator components when placed, thereby maintaining their relative positions.

Approaches taken in the prior art do not address the difficulty of shipping and integration of an axial flux machine having no internal bearings, nor of easing disassembly for safe removal and shipment from the field.

We have therefore appreciated the need for an improved assembly method of axial flux machines comprising a simplified means of assembly wherein bearings for the rotor are provided by adjacent machines or offset journals.

SUMMARY OF THE INVENTION

The present invention therefore provides a method of assembling an axial flux machine comprising: supplying a shaft, the shaft extending along an axis of the machine and comprising first and second rotor contact surfaces for mounting first and second rotors; attaching a first rotor to an outer surface of the shaft at the first rotor contact surface, the first rotor comprising an annulus having a hollow central region and having a set of permanent magnets disposed circumferentially at intervals around the axis of the machine facing inward of the machine; applying a spacer to the first rotor, the spacer for spacing the first rotor and a stator apart; arranging a stator co-axially with the shaft and adjacent the first rotor such that the spacer is contacted by a first side of the stator and the first rotor, the stator comprising a stator housing enclosing a plurality of stator bars disposed circumferentially at intervals around the axis of the machine, each of the stator bars having a set of coils wound therearound for generating a magnetic field, and the stator housing having an annular shape forming a hollow region about the axis of the machine, the shaft sitting within the hollow region of the stator; and attaching a second rotor to the outer surface of the shaft at the second rotor contact surface, the second rotor comprising an annulus having a hollow central region and having a set of permanent magnets disposed circumferentially at intervals around the axis of the machine facing inward of the machine, the second rotor being attached at a position of the shaft that is adjacent a second side of the stator, the second side of the stator being opposite the first side of the stator, wherein the first rotor contact surface is axially positioned on the shaft to define the axial position of the first rotor, and wherein the second rotor contact surface is axially separated from the first rotor contact surface to define the axial distance between the first and second rotors and to define the axial airgaps between the first rotor and stator and the second rotor and stator.

The present invention provides a solution to safe assembly of rotor and stator components of a bearingless axial flux motor for handling and shipping purposes.

The spacer may be applied to a surface of the first rotor that faces the stator, the spacer being formed of an annulus with a channel between the inner and outer circumferential portions for receiving the shaft. Such a spacer prevents touchdown between the first rotor and stator during transit.

The method may comprise applying a second spacer between the second surface of the stator and the second rotor. The second spacer may formed of an annulus with a channel between the inner and outer circumferential portions for receiving the shaft. The second spacer may have an axial thickness that is greater than a desired air-gap between the second rotor and stator of the assembled machine. Such a second spacer prevents damage occurring to the stator housing or the second rotor if the stator is caused to "hop" away from engagement with the first spacer during transportation of the machine.

The spacer in contact with the first rotor may have an axial thickness that is less than a desired air-gap between the first rotor and stator of the assembled machine.

An alternative spacer may be mounted to a surface of the first rotor that faces away from the stator, where the spacer is formed as an annulus comprising a plurality of spacing portions extending radially from the outer circumference of the annulus beyond the circumferential edge of the first rotor. The spacing portions extend axially towards the stator, and wherein the spacer portions are in contact with the first side of the stator when installed. The axial length of the spacer portions defines a gap between the stator and the rotor when installed.

For transit of the machine, the spacer may be attached to the stator to prevent the stator moving around.

The rotors are attached to the shaft by push-fit, bolt or screw fixings, or hot shrink fit.

The method further comprises attaching a mount to the second side of the stator housing, the mount having a mount surface facing away from the stator housing for mounting the machine to a structure.

The present invention also provides a method of installing an axial flux machine to a structure. The method comprises: assembling an axial flux machine as described above with reference to the use of the first type of spacer; supporting the shaft in axial alignment with the structure and at an axial position relative to the structure; attaching the second side of the stator housing to the structure; and removing the spacer, wherein the step of attaching the second side of the stator housing to the structure pulls the stator away from the first rotor such that the stator is moved axially to be centered axially between the first and second rotors.

The present invention also provides a method of installing an axial flux machine to a structure. The method comprises: assembling an axial flux machine as described with reference to the use of the second type spacer; supporting the shaft in axial alignment with the structure and at an axial position relative to the structure; attaching the second side of the stator housing to the structure; and removing the spacer.

For axial flux motor topologies the method of installing onto a structure in a system ensuring good axial alignment of rotor(s) and stator is important to long term reliability and because of these challenges this route is generally not taken with axial flux machines and motors, which are usually supplied with local bearing(s) which fix the position of rotor(s) axial position relative to the stator(s). Therefore without internal motor bearings, stack up tolerance variability between motors makes for complex alignment when integrated into adjacent machines and prevents in field replacement and it is these features which are addressed by the method of assembly of the present invention.

The shaft of the machine comprises a first engagement surface on a first end of the shaft for coupling torque in or out of the machine, a second engagement surface at a second end of the shaft for coupling torque in or out of the machine, a first radial bearing mounting surface on the first end of the shaft and a second radial bearing mounting surface on the second end of the shaft, wherein the first end of the shaft is on the same side of the machine as the first rotor and the second end of the shaft is on the same side of the machine as the second rotor.

The step of attaching the second side of the stator housing to the structure may comprise: arranging the structure on to the shaft at the second end of the shaft, the structure comprising a second radial bearing on an inner circumferential surface of a hollow portion in the structure, and the structure being supported on the shaft by the second radial bearing, the second radial bearing being seated on the shaft at the second radial bearing mounting surface; providing an axial shim in an axial path between the structure and stator housing; and attaching the second side of the stator housing to the structure, wherein the axial shim has a thickness that defines an axial position of the structure relative to the stator housing such that when the structure is driven into attachment with the mount, the stator moves axially away from the first rotor to a central axial location between the first and second rotors.

The machine may comprise a mount having a mounting surface and for mounting the stator housing and structure, the method of attaching the second side of the stator housing further comprises: attaching the mount to the second side of the stator housing, the mounting surface facing away from the stator housing; and attaching the mounting surface to the structure.

The axial shim may be provided between the structure and second radial bearing, between the second radial bearing and the second radial bearing mounting surface, or between the structure and the stator housing, or, when there is a mount, between the structure and the mounting surface of the mount.

The step of providing an axial shim may comprises: measuring at least one axial length of a portion within the machine; and selecting an axial shim thickness depending on the at least one measured axial length such that the step of attaching the mount to the structure causes sufficient axial movement of the stator in order to move the stator axially away from the first rotor. The at least one measured axial length of a portion within the machine is one or more of: an axial distance between the second radial bearing mounting surface and the first rotor; an axial distance between the first and second rotor contact surfaces; an axial distance between the second radial bearing mount surface and the second rotor contact surface; an axial length of the structure between the surface of the second radial bearing in contact with the second radial bearing mount surface and the surface of the structure in contact with the mount surface of the mount; and an axial distance of the mount between the mount surface and the surface of the mount in contact with the stator housing.

When the stator is pulled away from the first rotor, the spacer is preferably released from between the first rotor and stator.

The structure may covers or enclose the second rotor. If a mount is used, the structure and/or the mount may cover or enclose the second rotor to protect it from the external environment.

The method may also comprise: attaching the first side of the stator housing to a second structure. The step of attaching the first side of the stator housing to a second structure may comprise: arranging a second structure on to the shaft at the first end of the shaft, the second structure comprising a first radial bearing on an inner circumferential surface of a hollow portion in the second structure, and the second structure being supported on the shaft by the first radial bearing, the first radial bearing being seated on the shaft at the first radial bearing mounting surface; and attaching the second side of the stator housing to the second structure.

The machine may comprise a second mount having a mounting surface and for mounting the stator housing and second structure, the method of attaching the first side of the stator housing further comprising: attaching a second mount to the first side of the stator housing, the second mount having a mounting surface at an end of the second mount away from the stator housing; and attaching the mounting surface of the second mount to the second structure.

The second structure may cover or enclose the first rotor. If a second mount is used, the second structure and/or the second mount may cover or enclose the first rotor to protect it from the external environment.

The second structure preferably supports the shaft in axial alignment with the first structure and axial position in the first structure.

In any of the above, the structures may comprise a portion of an engine of a vehicle or a portion of a transmission system of the vehicle.

The present invention also provides an axial flux machine mounted to a structure comprising: a stator comprising a stator housing enclosing a plurality of stator bars disposed circumferentially at intervals around an axis of the machine, each of the stator bars having a set of coils wound therearound for generating a magnetic field, and the stator housing having an annular shape forming a hollow region about the axis of the machine; a first rotor comprising a set of permanent magnets and mounted for rotation about the axis of the machine, the rotor being spaced apart from the stator along the axis of the machine to define a gap between the stator and rotor and in which magnetic flux in the machine is generally in an axial direction, and the rotor formed of an annulus and having a hollow central region about the axis of the machine; a second rotor disposed on an opposite side of the stator to the first rotor, the second rotor comprising a set of permanent magnets on a first side of the second rotor facing the stator, the second rotor being mounted for rotation about the axis of the machine and relative to the stator, the second rotor being spaced apart from the stator along the axis of the machine to define an axial gap between the stator and second rotor and in which magnetic flux in the machine is generally in an axial direction; a shaft extending along the axis of the machine and comprising first and second rotor contact surfaces, the first and second rotors being mounted respectively to the first and second rotor contact surfaces, and the shaft comprising a first radial bearing mounting surface on the first end of the shaft and a second radial bearing mounting surface on the second end of the shaft, the first end of the shaft is on the same side of the machine as the first rotor and the second end of the shaft is on the same side of the machine as the second rotor; wherein the structure is arranged on the shaft at the second end of the shaft and attached to the stator housing, the structure comprising a second radial bearing on an inner circumferential surface of a hollow portion in the structure, and the structure being supported on the shaft by the second radial bearing, the second radial bearing being seated on the shaft at the second radial bearing mounting surface.

The machine may comprise a mount between the second side of the stator housing and the structure, wherein the mount comprises a mounting surface facing away from the stator housing, and wherein the structure is mounted to the mounting surface of the mount, and the second side of the stator housing is mounted to the mount.

The machine may also comprise an axial shim between the structure and second radial bearing, between the second radial bearing and the second radial bearing mounting surface, or between the mount and the stator housing, or, when there is a mount, between the structure and the mount surface of the mount. The axial shim may have a thickness that defines an axial position of the structure relative to the stator housing.

The first rotor contact surface may be axially positioned on the shaft to define the axial position of the first rotor, and wherein the second rotor contact surface is axially separated from the first rotor contact surface to define the axial distance between the first and second rotors and to define the axial airgaps between the first rotor and stator and the second rotor and stator.

The structure may covers or enclose the second rotor. When a mount is used, the structure and/or mount may cover or enclose the second rotor.

The machine may also be mounted to a second structure, wherein the second structure is arranged on the shaft at the first end of the shaft and attached to the first side of the stator housing, the second structure comprising a first radial bearing on an inner circumferential surface of a hollow portion in the second structure, and the second structure being supported on the shaft by the first radial bearing, the first radial bearing being seated on the shaft at the first radial bearing mounting surface.

When there is a second structure, the may also be provided a second mount between the first side of the stator housing and the second structure, wherein the mount comprises a mounting surface facing away from the first side of the stator housing, and wherein the second structure is mounted to the mounting surface of the second mount, and the first side of the stator housing is mounted to the mount.

The second structure may cover or enclose the first rotor. When a second mount is used, the second structure and/or second mount may cover or enclose the first rotor.

The above-mentioned structures may comprise a portion of an engine of a vehicle or a portion of a transmission system of the vehicle.

The present invention may also provide an axial flux machine comprising: a stator comprising a stator housing enclosing a plurality of stator bars disposed circumferentially at intervals around an axis of the machine, each of the stator bars having a set of coils wound therearound for generating a magnetic field, and the stator housing having an annular shape forming a hollow region about the axis of the machine; a first rotor comprising a set of permanent magnets and mounted for rotation about the axis of the machine, the rotor being spaced apart from the stator along the axis of the machine to define a gap between the stator and rotor and in which magnetic flux in the machine is generally in an axial direction, and the rotor formed of an annulus and having a hollow central region about the axis of the machine; a second rotor disposed on an opposite side of the stator to the first rotor, the second rotor comprising a set of permanent magnets on a first side of the second rotor facing the stator, the second rotor being mounted for rotation about the axis of the machine and relative to the stator, the second rotor being spaced apart from the stator along the axis of the machine to define an axial gap between the stator and second rotor and in which magnetic flux in the machine is generally in an axial direction; a shaft extending along the axis of the machine and comprising first and second rotor contact surfaces, the first and second rotors being mounted respectively to the first and second rotor contact surfaces; a spacer for spacing the first rotor and stator apart; wherein the first rotor contact surface is axially positioned on the shaft to define the axial position of the first rotor, and wherein the second rotor contact surface is axially separated from the first rotor contact surface to define the axial distance between the first and second rotors and to define the axial airgaps between the first rotor and stator and the second rotor and stator.

The spacer may be between the first rotor and first side of the stator and in contact with the first rotor and first side of the stator. The spacer may be formed of an annulus with a channel between the inner and outer circumferential portions for receiving the shaft.

The machine may also be provided with a second spacer in between the second rotor and the second side of the stator, which protects the stator housing and second rotor from damage during transit should the stator be caused to "hop" from its contact with the first spacer on the first side of the machine. The second spacer may have an axial thickness that is greater than a desired air-gap between the second rotor and stator of the assembled machine.

The spacer in contact with the first rotor may have an axial thickness that is less than a desired air-gap between the first rotor and stator of the assembled machine.

Alternatively, the spacer may be mounted to a surface of the first rotor that faces away from the stator. This spacer may be formed as an annulus comprising a plurality of spacing portions extending radially from the outer circumference of the annulus beyond the circumferential edge of the first rotor, the spacing portions also extending axially towards the stator, and wherein the spacer portions are in contact with the first side of the stator when installed. The axial length of the spacer portions defines a gap between the stator and the rotor when installed.

For transit of the machine, the spacer may be attached to the stator to prevent the stator moving around.

The machine may also comprise a mount to the second side of the stator housing, the mount having a mount surface facing away from the stator housing for mounting the machine to a structure.

In any of the machines described above, the first and/or second engagement surfaces may comprise splines for engagement with respective shafts.

Furthermore, in any of the machines described above the stator housing may define a chamber incorporating cooling medium in contact with the coils to cool the coils, the stator housing including a port for supply and a port for drainage of the cooling medium.

In any of the above machines, the machine is a torque source, a motor or generator.

LIST OF FIGURES

The present invention will now be described, by way of example of, and with reference to the accompanying figures, in which.

Figure 4A:
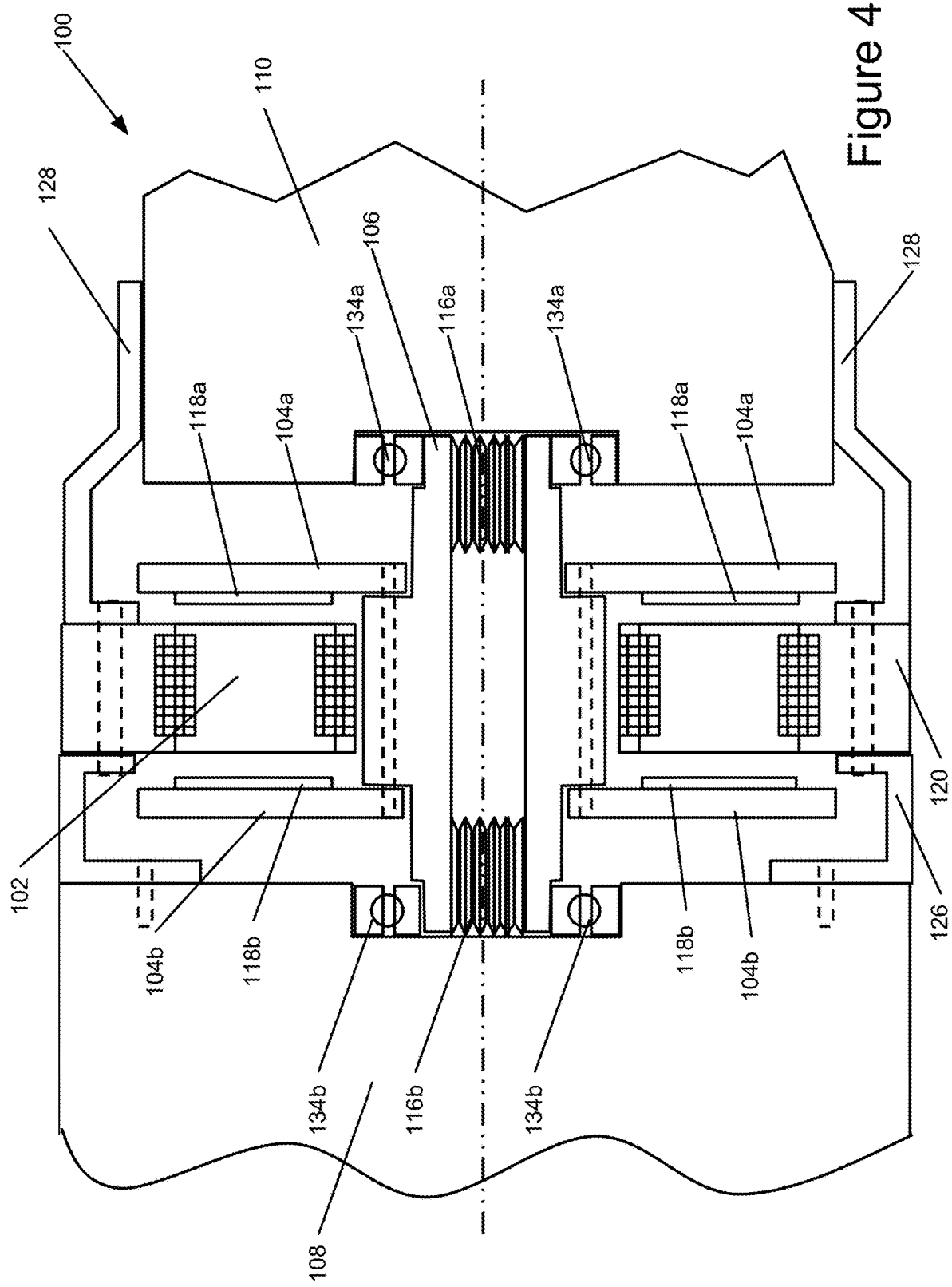
Figure 4B:
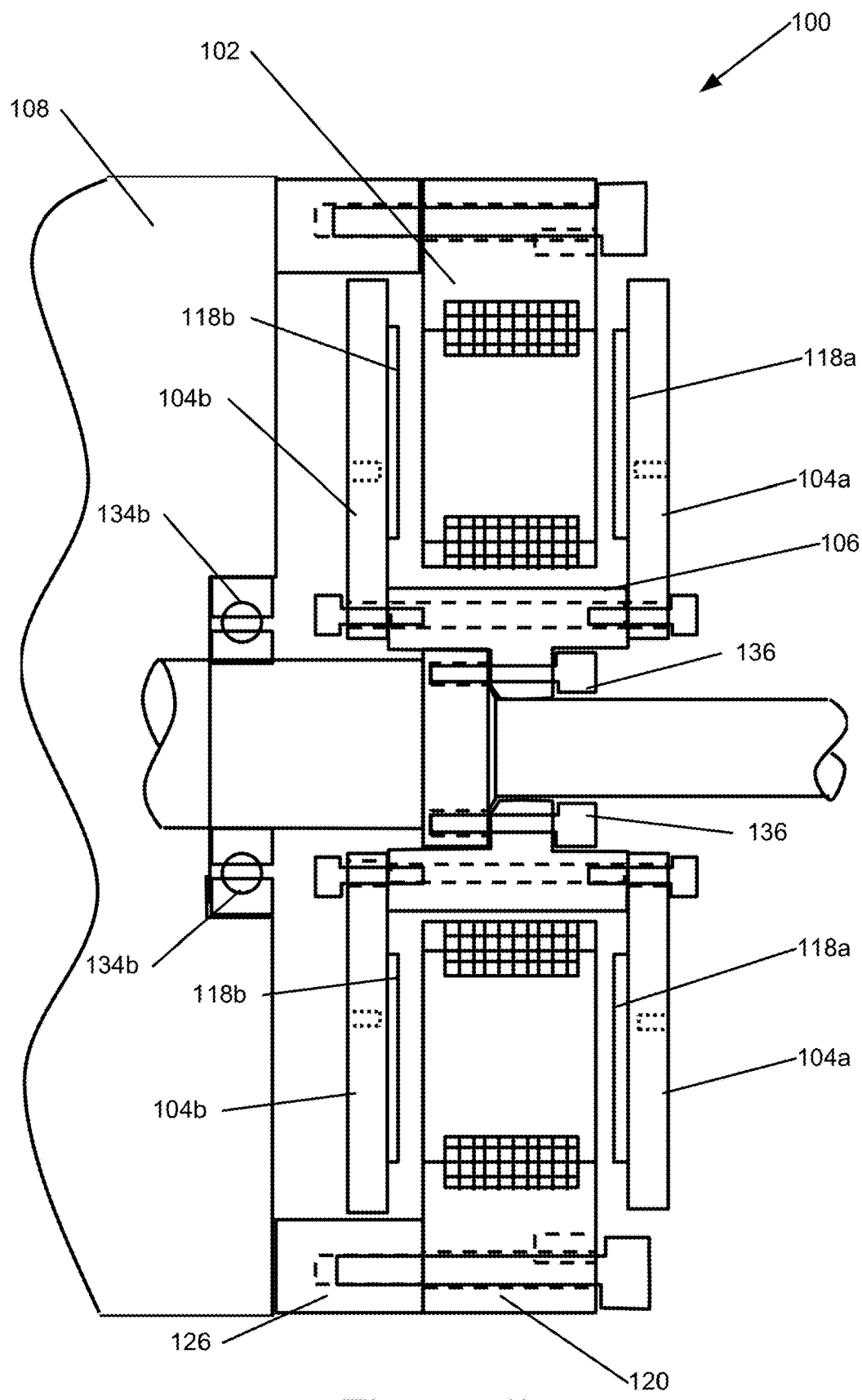
Figure 4C:
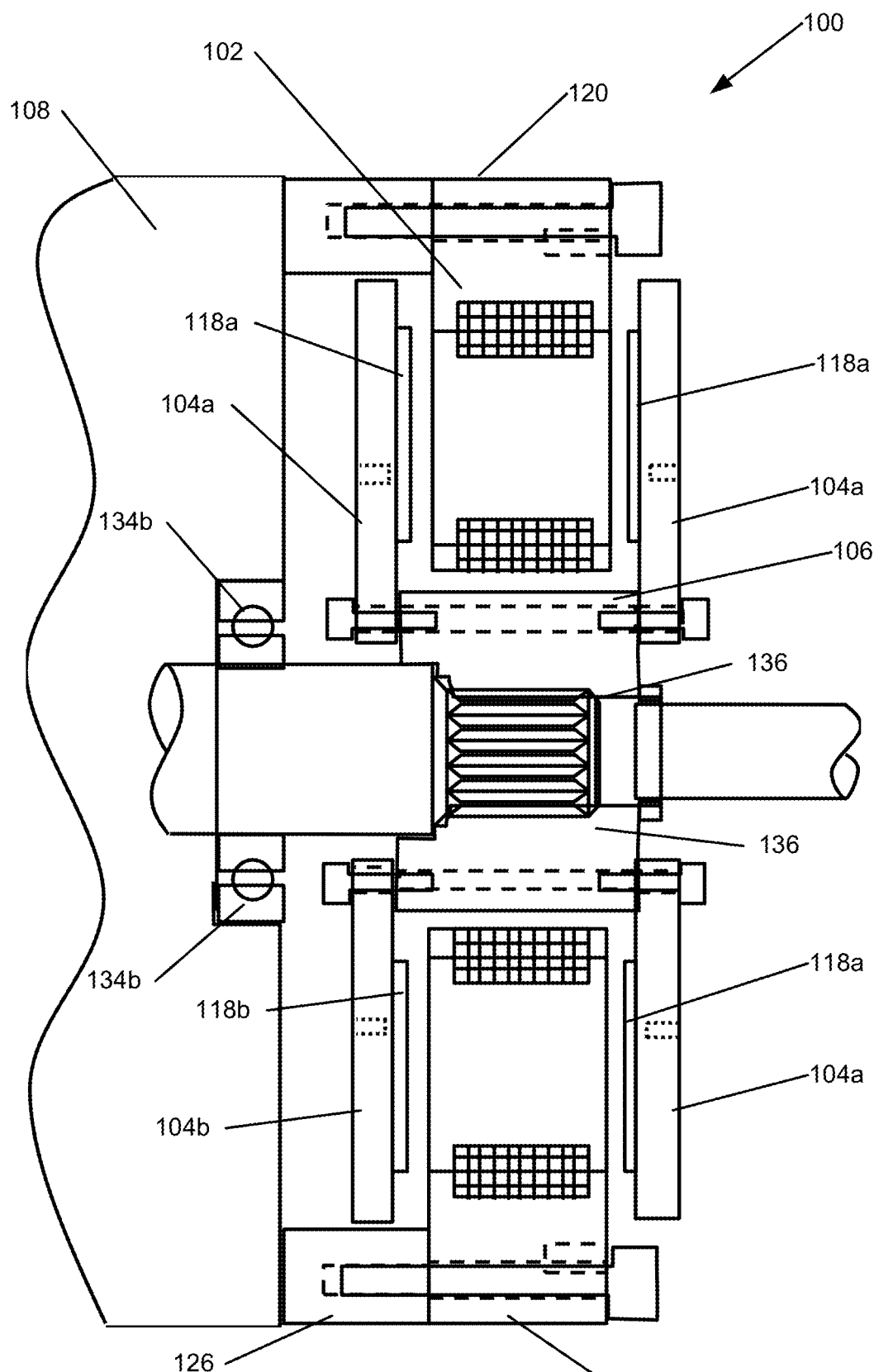
Figure 5:
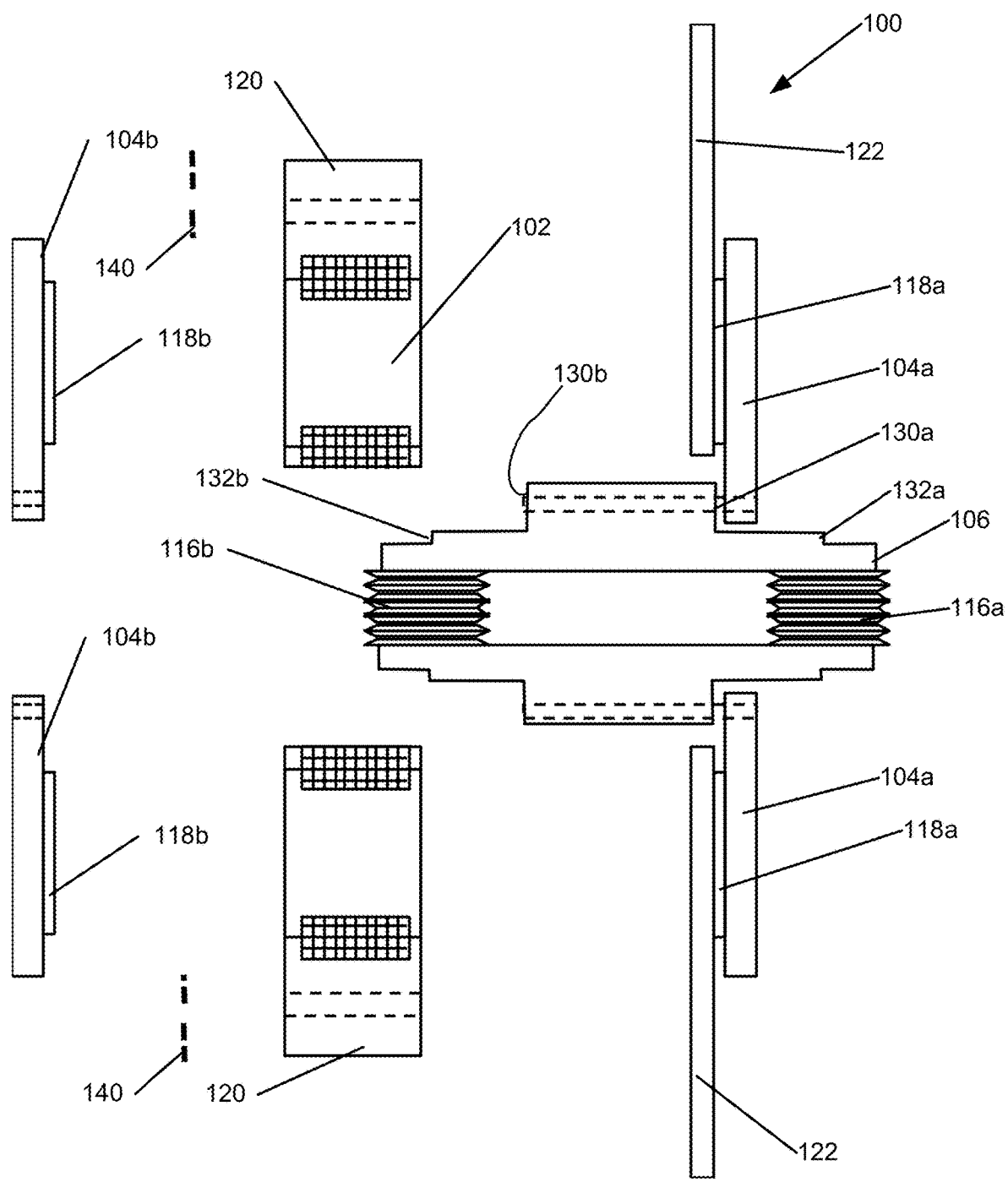
Figure 6:
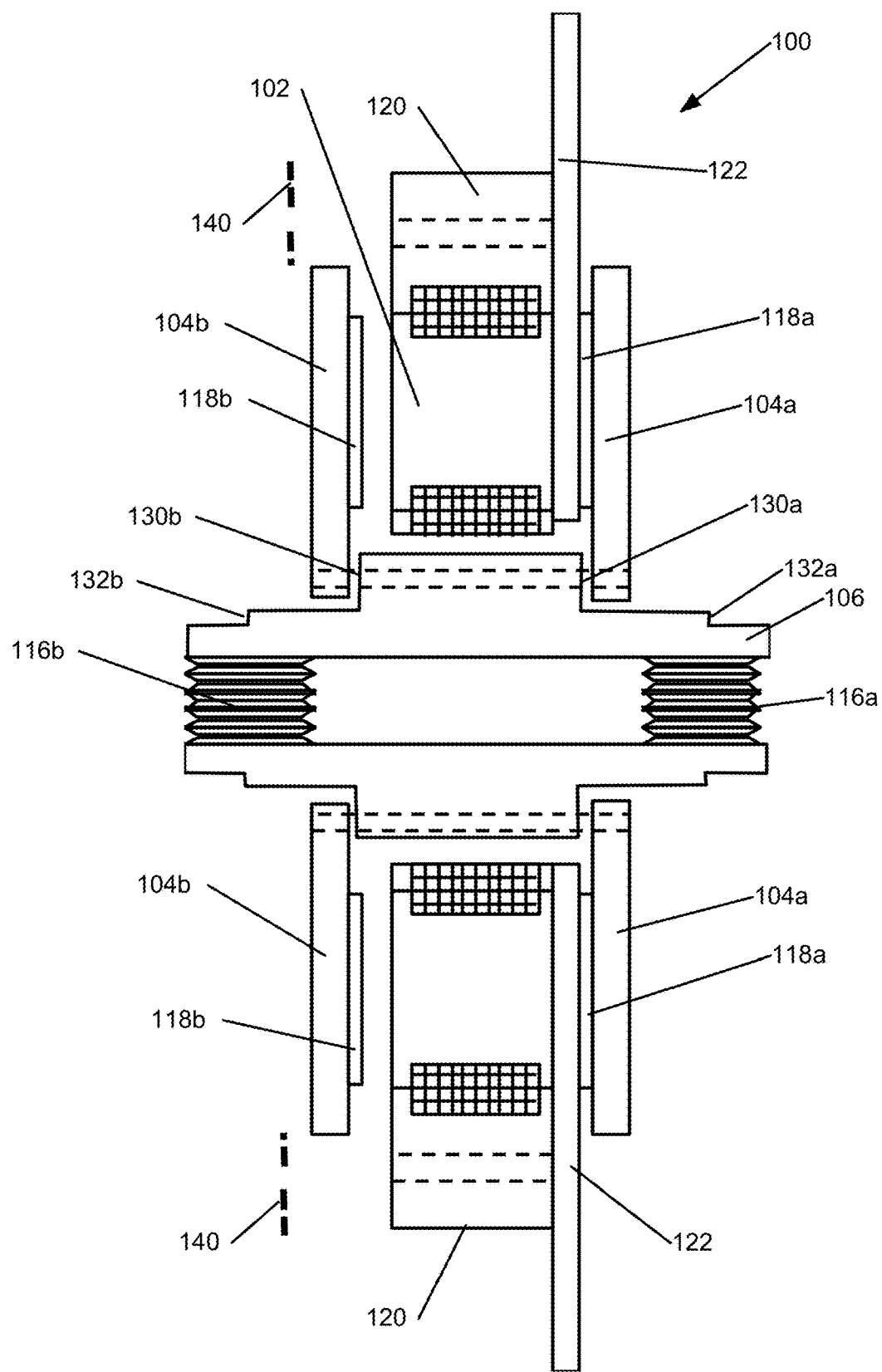
Figure 7:
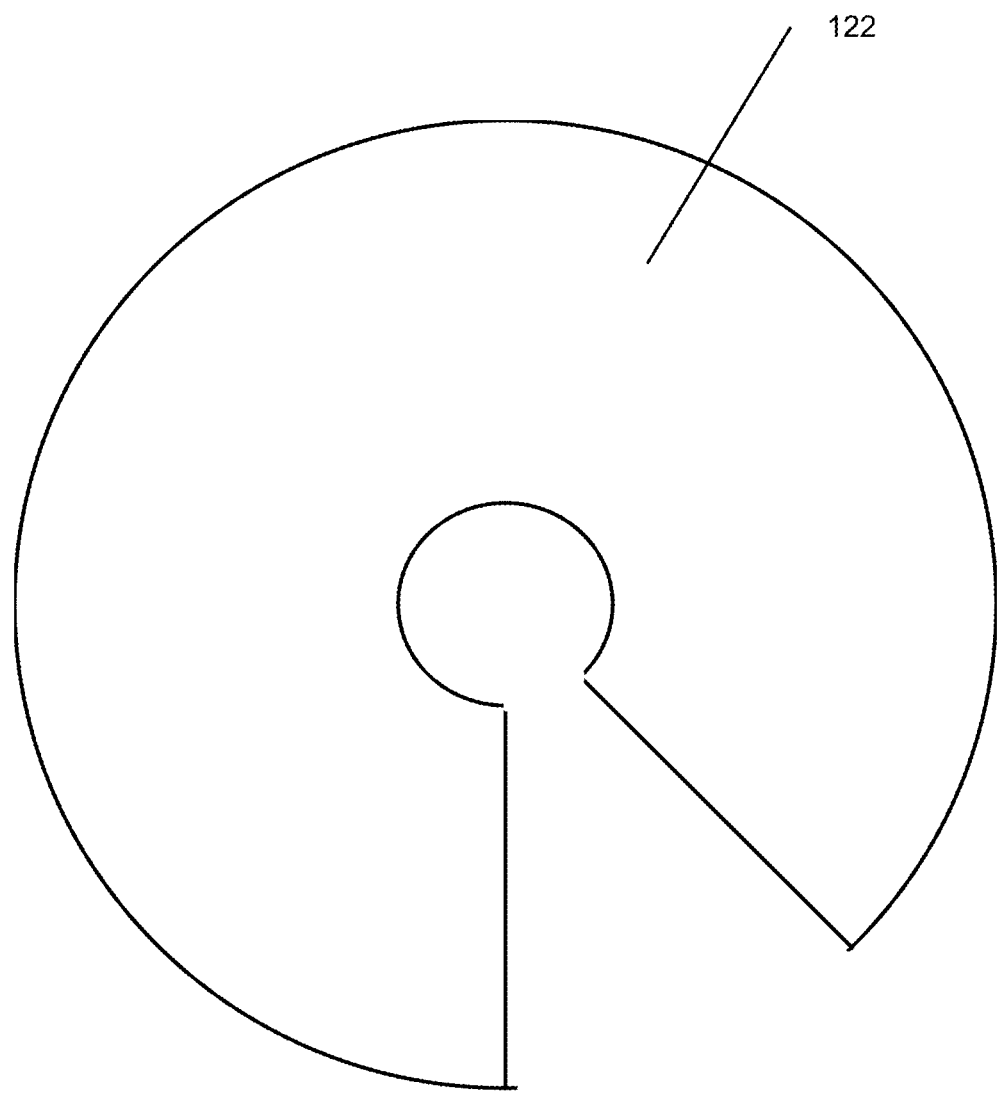
Figure 8:
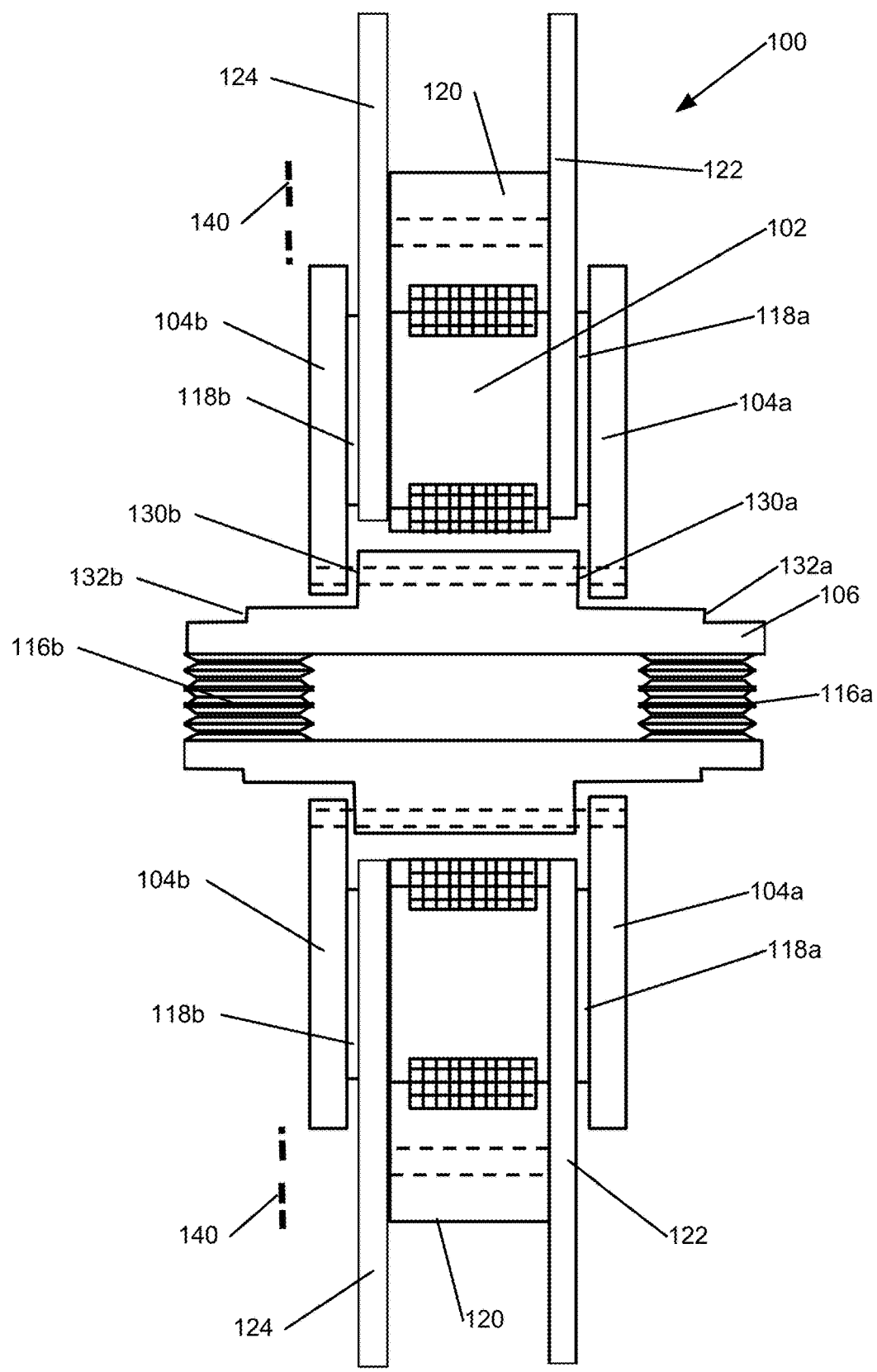
Figure 9:
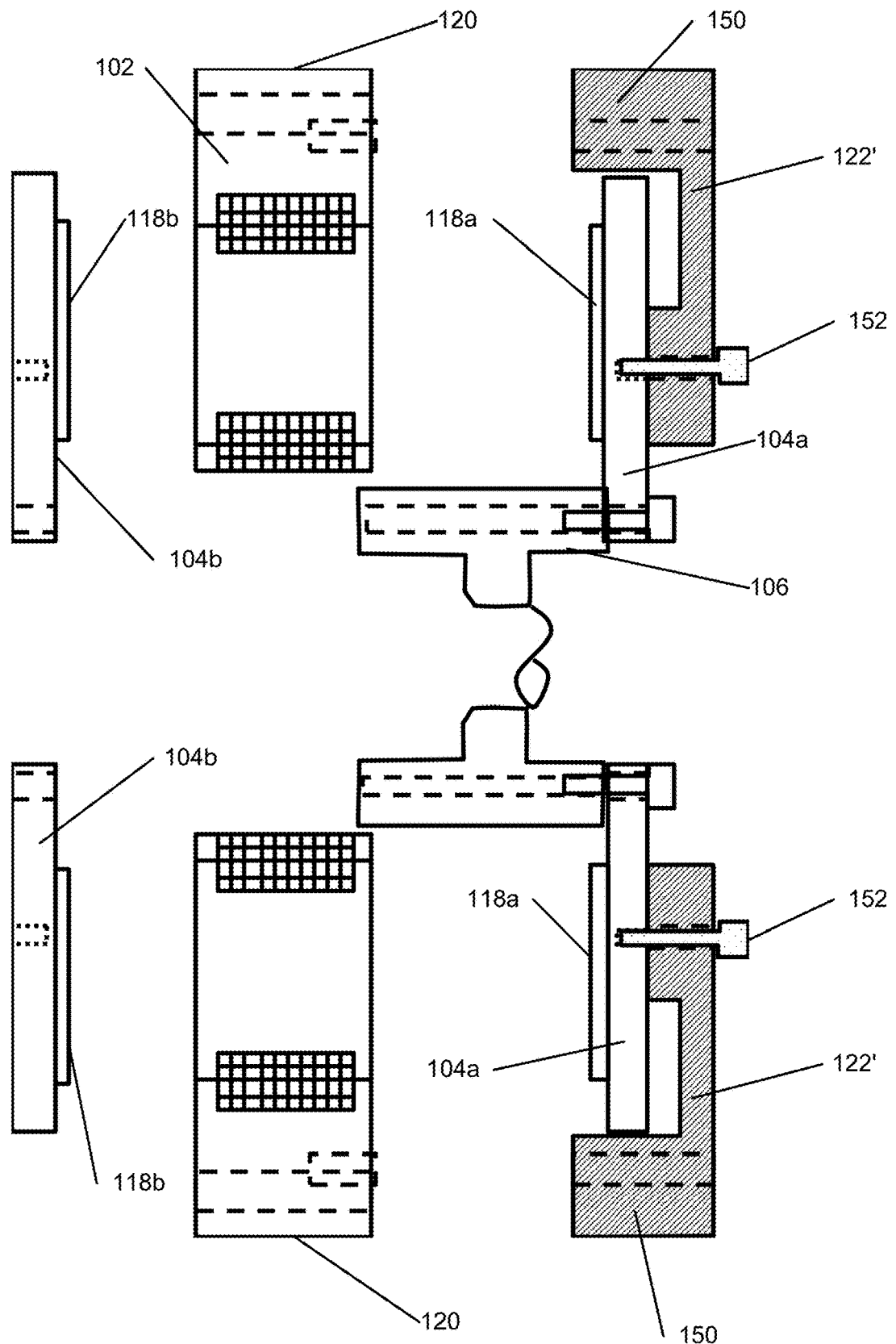
Figure 10:
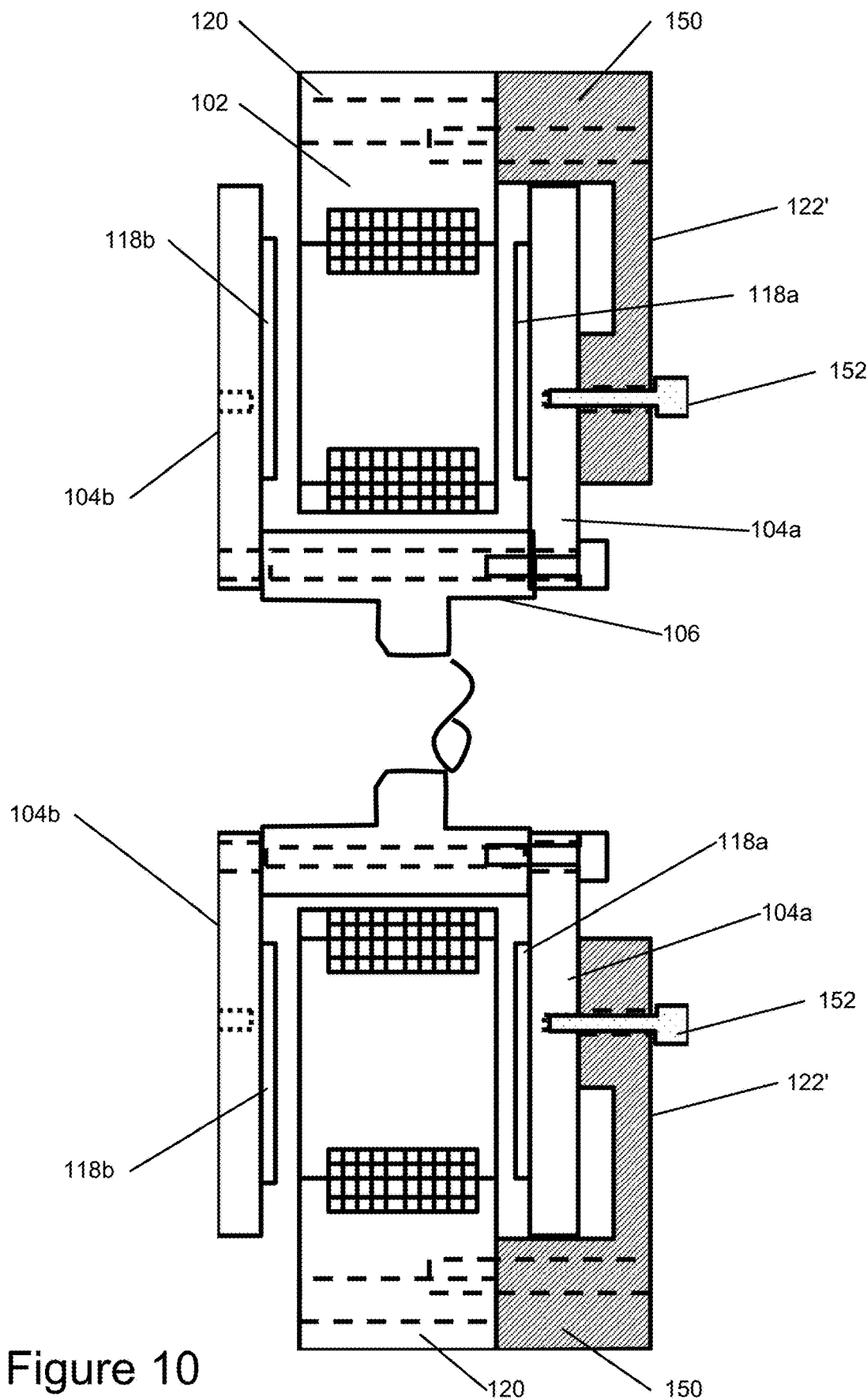
Figure 11:
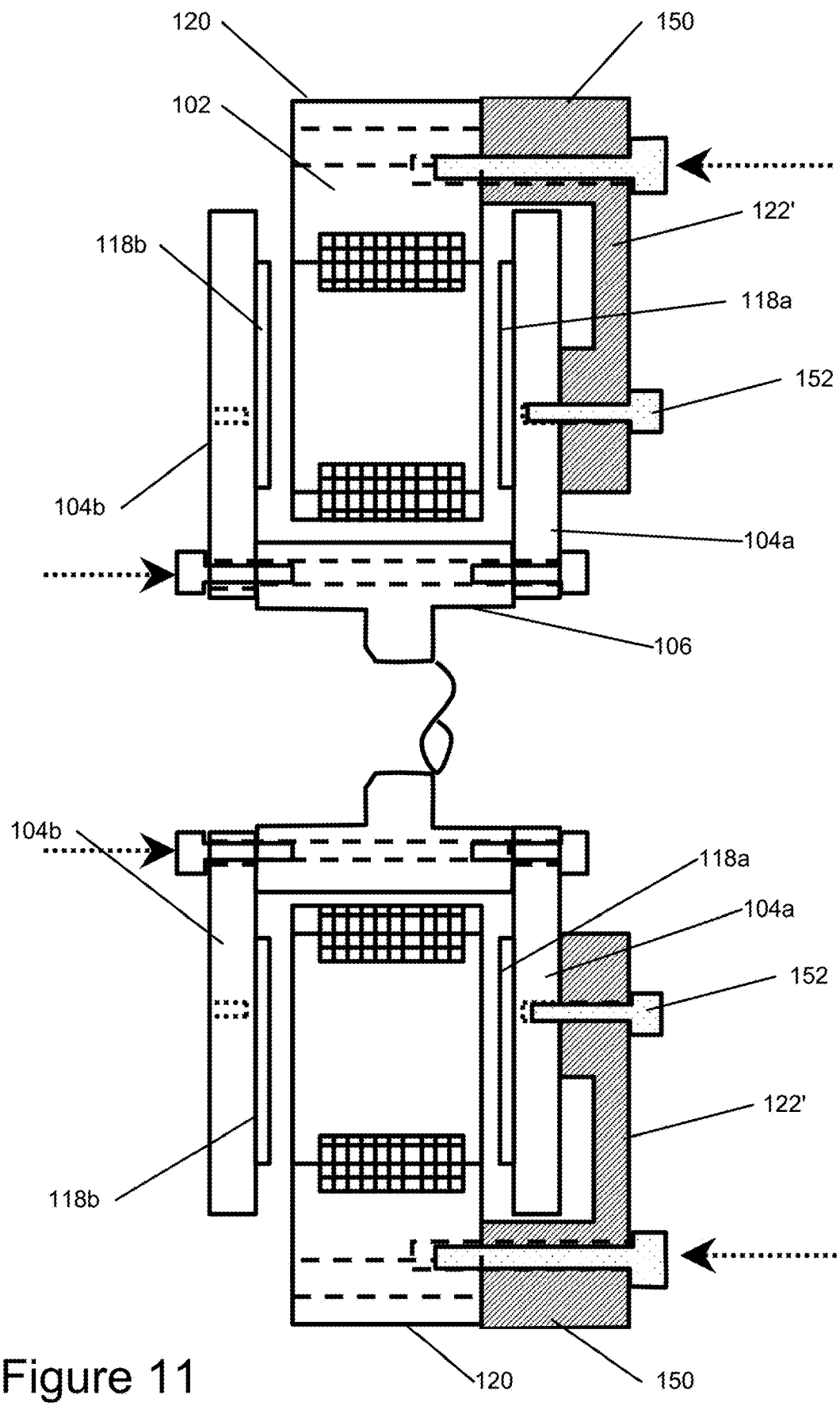
Figure 12A:
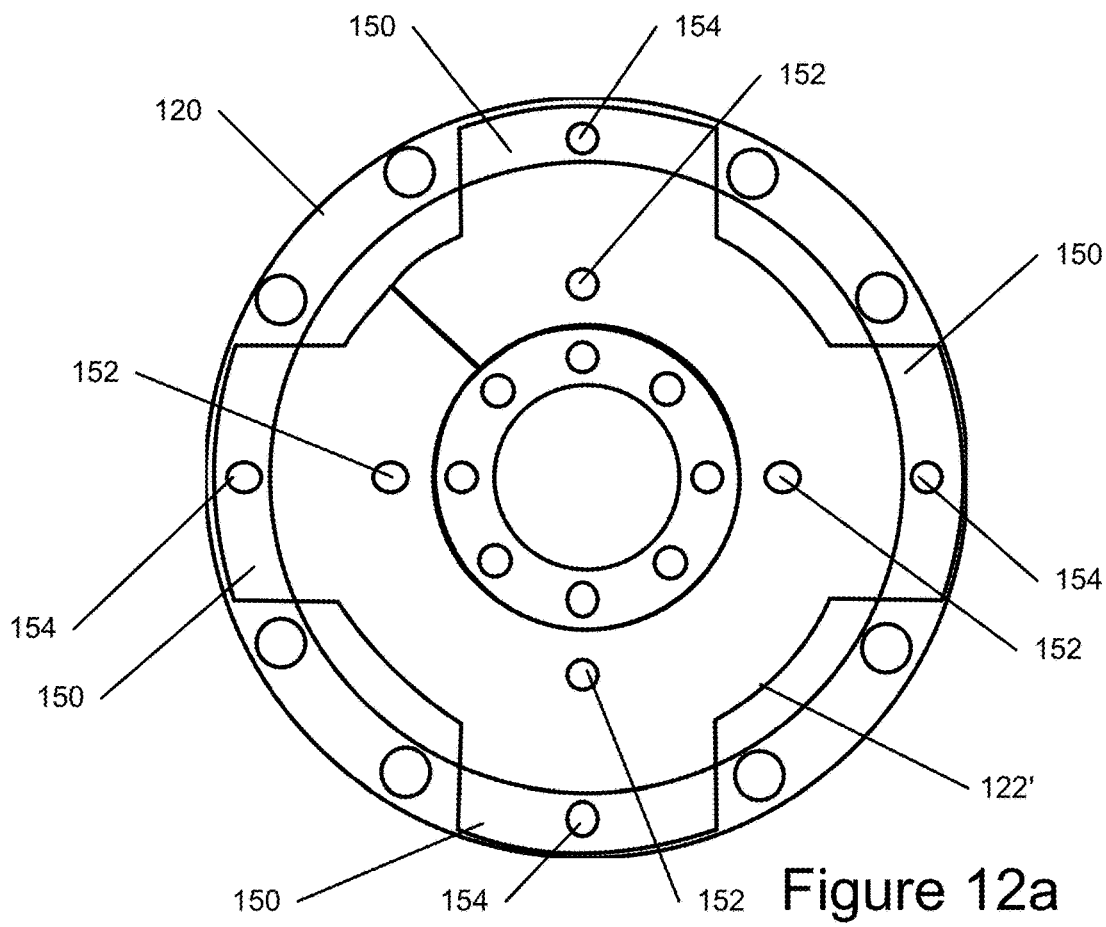
Figure 12B:
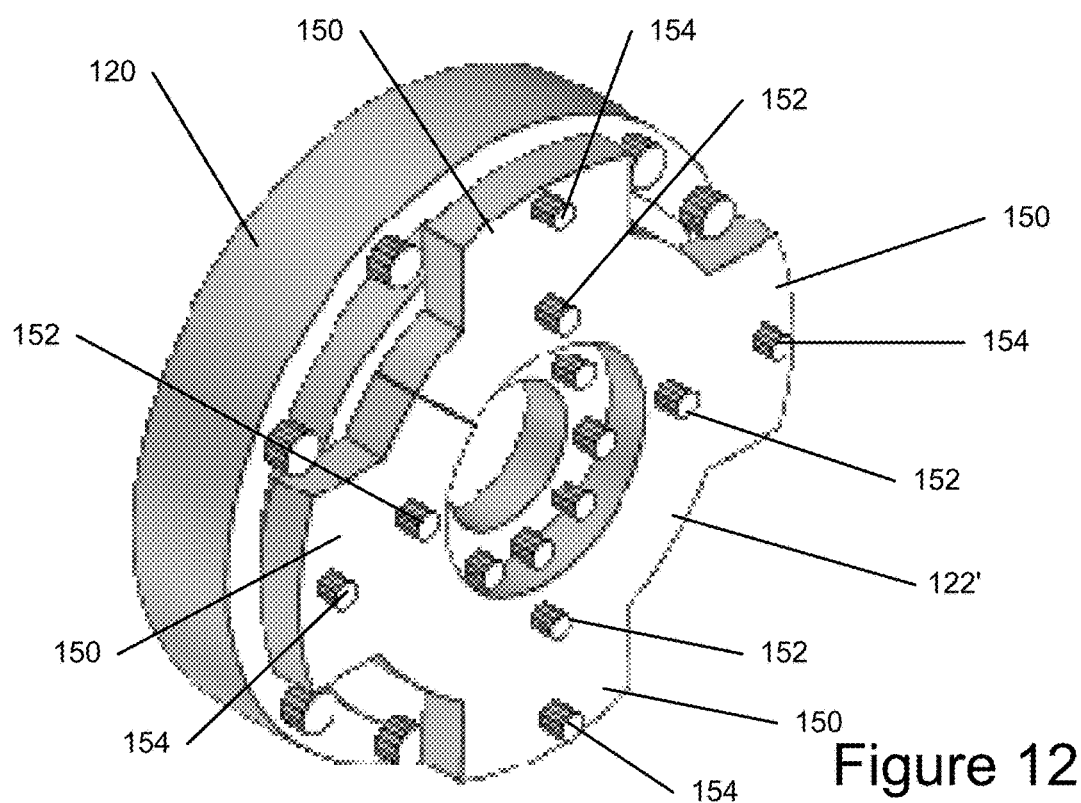
Figure 13:
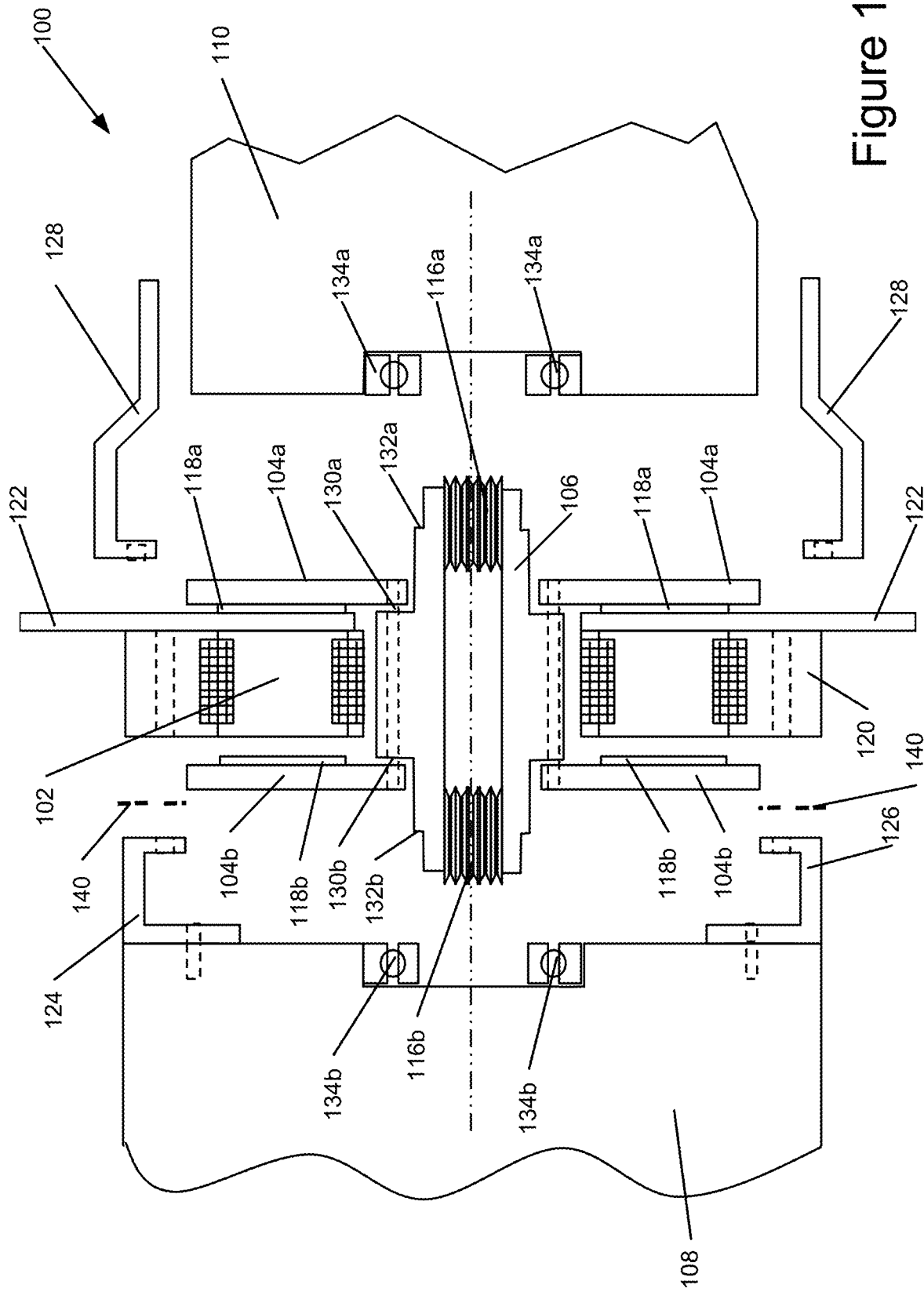
Figure 14:
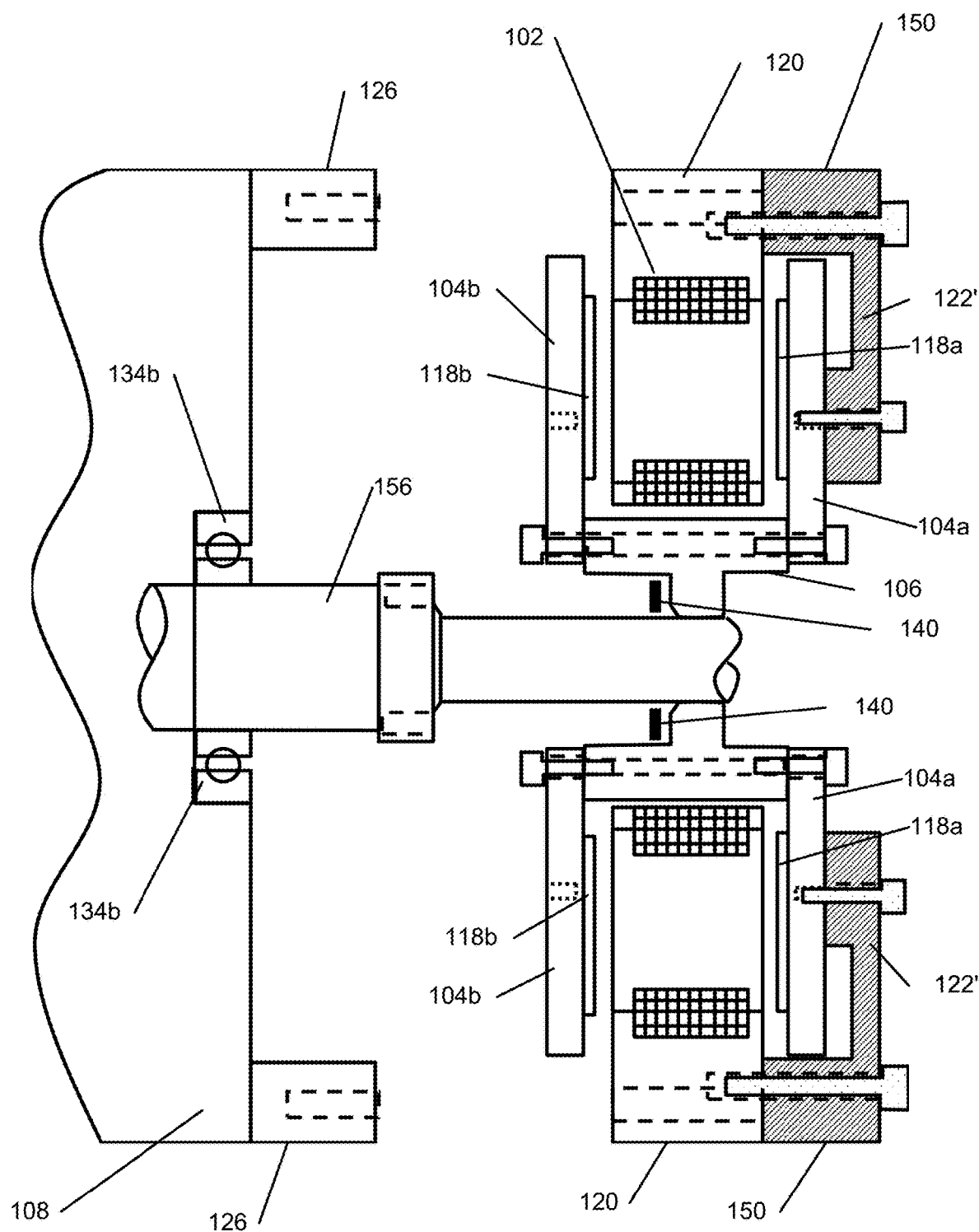
Figure 15:
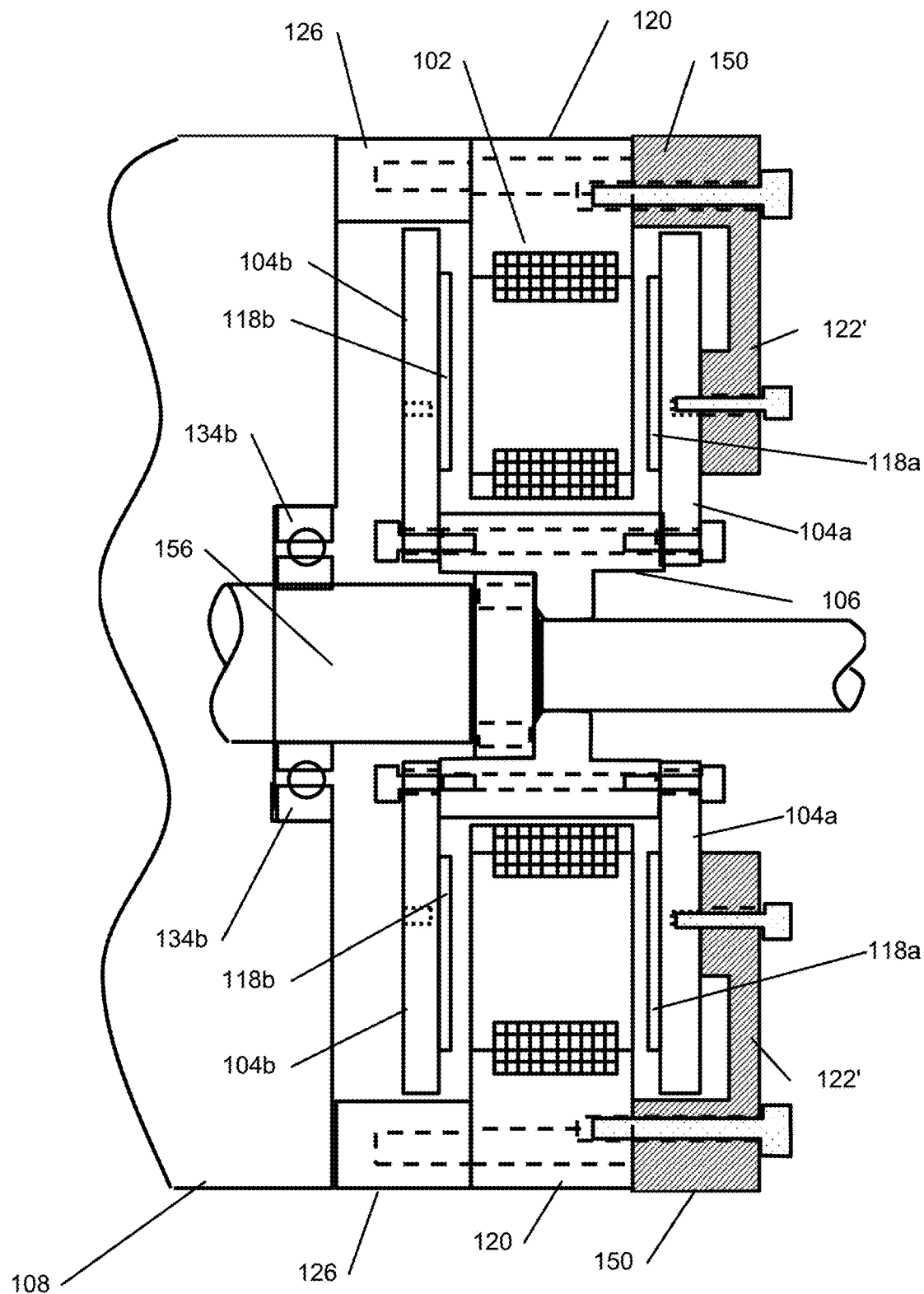
Figure 16:
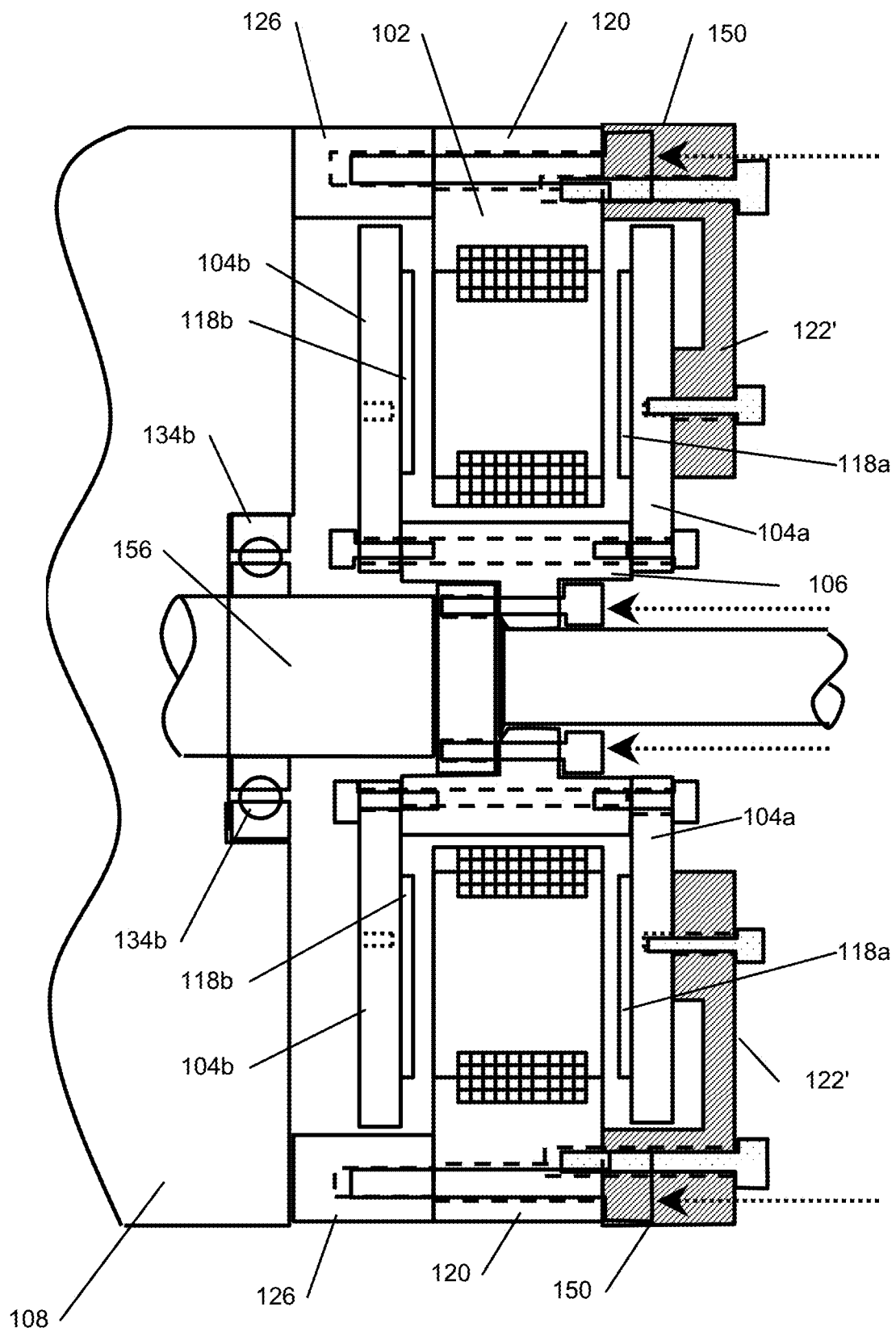
Figure 17:
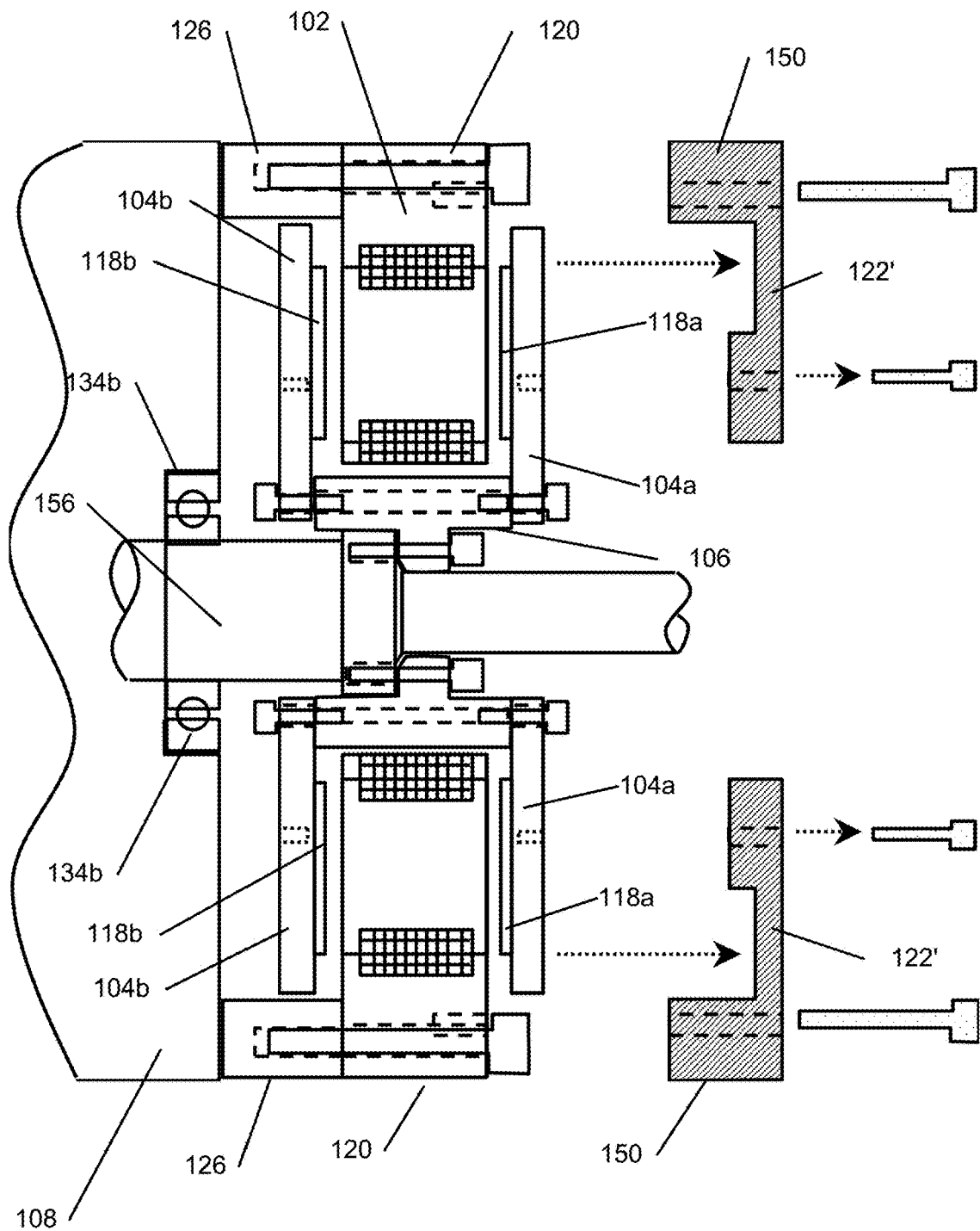

FIGS. 4a, b and c show assembled axial flux machines installed on other structures;

FIG. 5 shows the axial flux machine of FIG. 4 using a first type of spacer during assembly;

FIG. 6 shows the axial flux machine of FIG. 4 using a first type of spacer during assembly;

FIG. 7 shows the first type of spacer;

FIG. 8 shows the axial flux machine of FIG. 4 using the first type of spacer during assembly; and FIG. 9 shows the axial flux machine of FIG. 4 using a second type of spacer during assembly;

FIG. 10 shows the axial flux machine of FIG. 4 using a second type of spacer during assembly;

FIG. 11 shows the axial flux machine of FIG. 4 using a second type of spacer during assembly;

FIGS. 12a and 12b show the second type of spacer;

FIG. 13 shows the assembled axial flux machine of FIG. 4 using a first type of spacer during installation;

FIG. 14 shows the assembly of the axial flux machine of FIG. 4 using a second type of spacer during installation;

FIG. 15 shows the assembly of the axial flux machine of FIG. 4 using a second type of spacer during installation;

FIG. 16 shows the assembly of the axial flux machine of FIG. 4 using a second type of spacer during installation;

FIG. 17 shows the assembly of the axial flux machine of FIG. 4 using a second type of spacer during installation.

DETAILED DESCRIPTION OF THE PREFERRED EMBODIMENTS

Figure 1A:
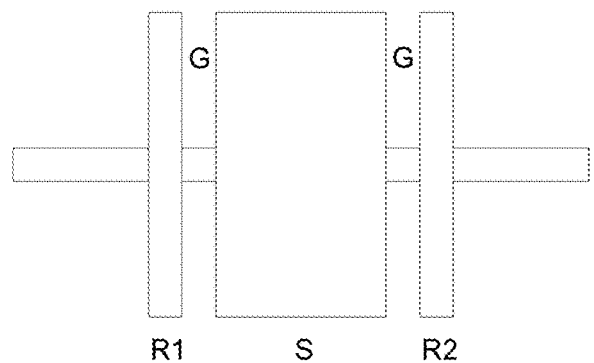
FIGS. 1a to 1c show, respectively, a general configuration of a two-rotor axial flux machine, example topologies for axial flux permanent magnet machines, and a schematic side view of a yokeless and segmented armature (YASA) machine.
Figure 1B:
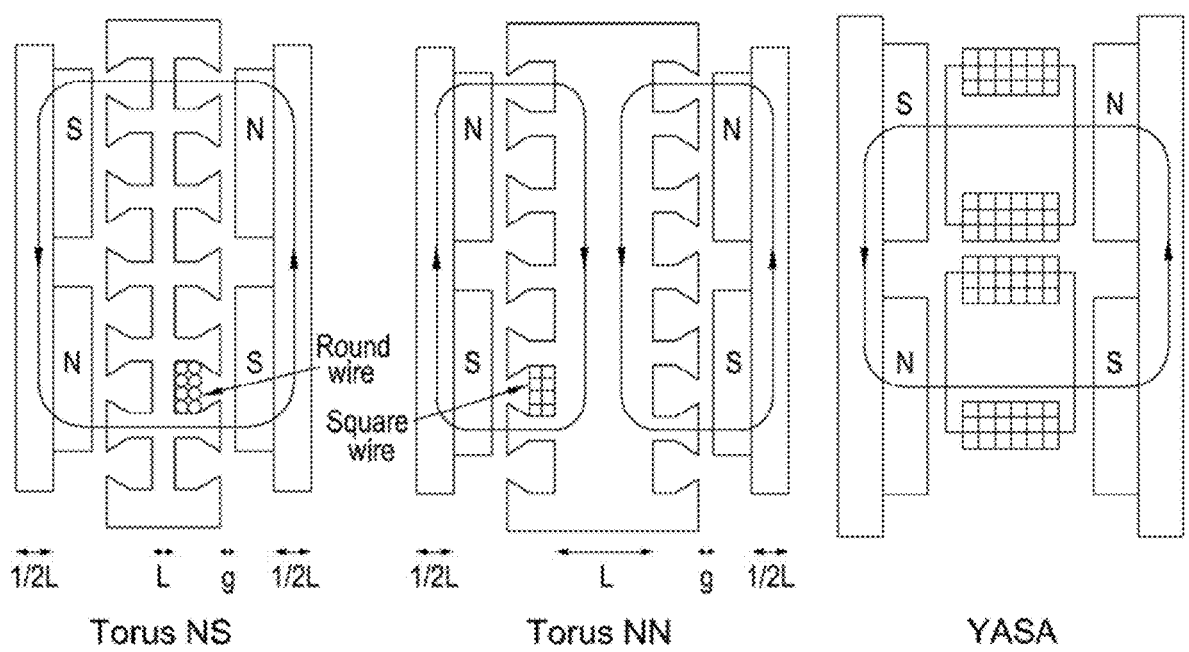
Figure 1C:
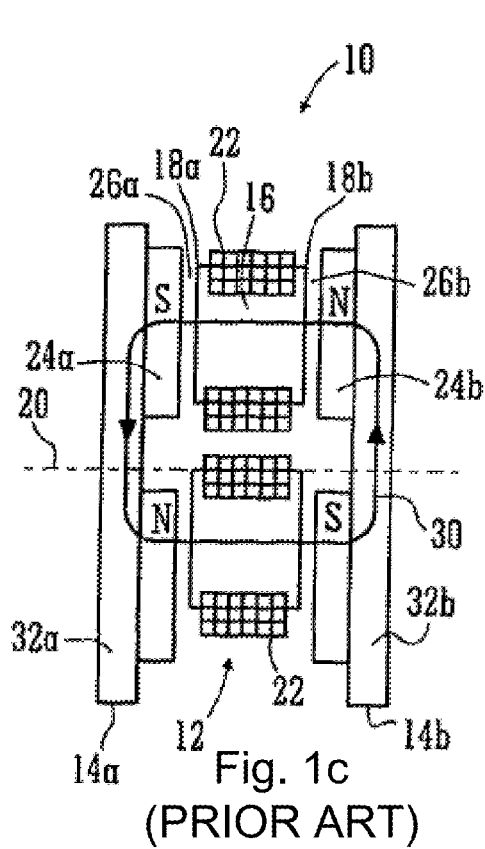
Figure 2:
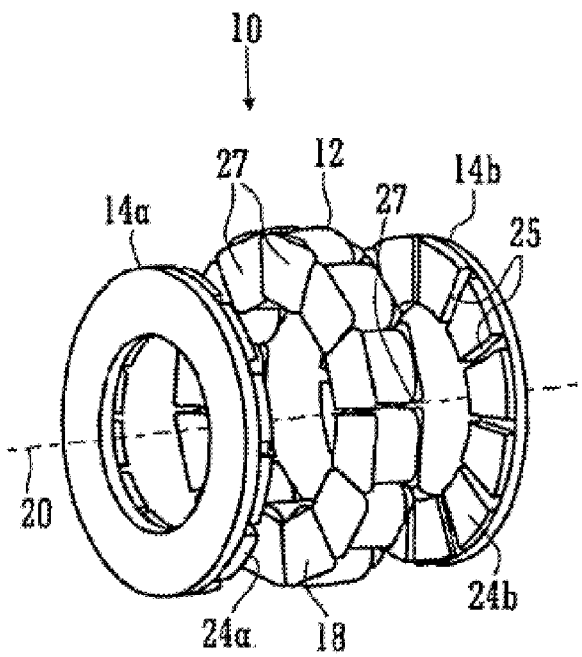
FIG. 2 shows a perspective view of the YASA machine of FIG. 1c.
Figure 3:
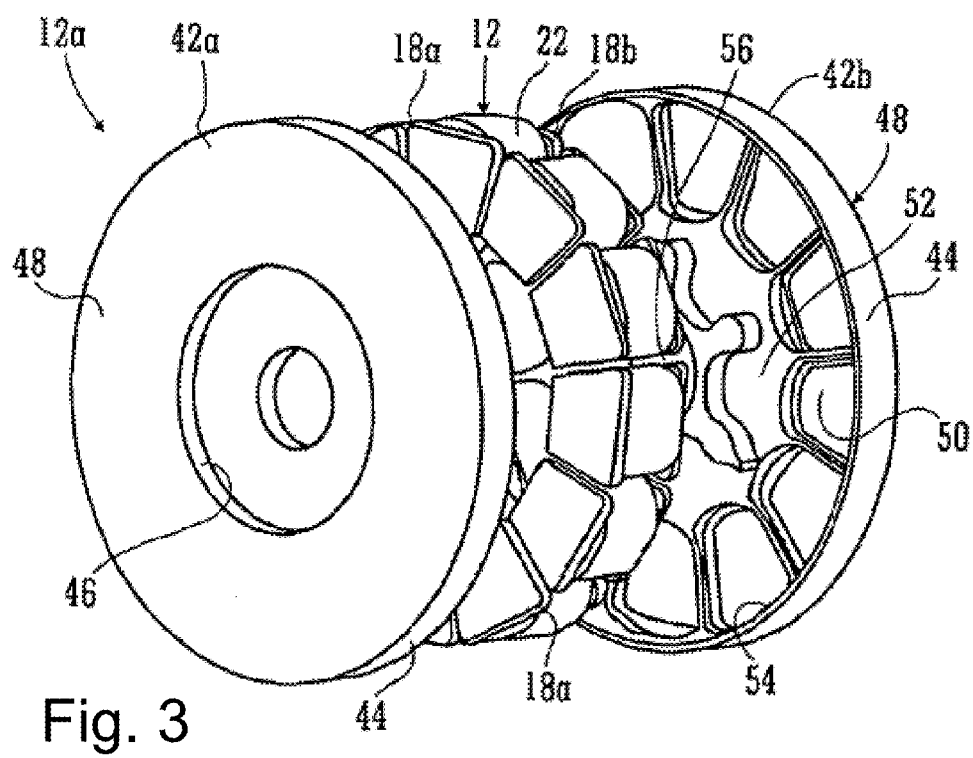
FIG. 3 shows a perspective exploded view of a stator and stator housing for a YASA machine.

Referring first to FIGS. 1c, 2 and 3, which are taken from our PCT application WO2012/022974, FIG. 1c shows a schematic illustration of a yokeless and segmented armature machine 10.

The machine 10 comprises a stator 12 and two rotors 14a,b. The stator 12 is a collection of separate stator bars 16 spaced circumferentially about a rotation axis 20 of the rotors 14a,b. Each bar 16 has its own axis (not shown) which is preferably, but not essentially, disposed parallel to the rotation axis 20. Each end of each stator bar is provided with a shoe 18a,b which serves a physical purpose of confining a coil stack 22, which stack 22 is preferably of square/ rectangular section insulated wire so that a high fill factor can be achieved. The coils 22 are connected to an electrical circuit (not shown) that, in the case of a motor, energizes the coils so that the poles of the resultant magnetic fields generated by the current flowing in the coils is opposite in adjacent stator coils 22.

The two rotors 14a,b carry permanent magnets 24a, b that face one another with the stator coil 22 between (when the stator bars are inclined—not as shown—the magnets are likewise). Two air gaps 26a,b are disposed between respective shoe and magnet pairs 18a/24a, 18b/24b. There are a number of coils and magnets spaced around the axis of rotation 20 and, preferably, there are a different number of coils and magnets so that the coils do not all come into registration with the corresponding magnet pair at the same time and at the same rotational position of the rotor with respect to the stator. This serves to reduce cogging.

In a motor the coils 22 are energized so that their polarity alternates serving to cause coils at different times to align with different magnet pairs, resulting in torque being applied between the rotor and the stator. The rotors 14a,b are generally connected together (for example by a shaft, not shown) and rotate together about the axis 20 relative to the stator 12. The magnetic circuit 30 is provided by two adjacent stator bars 16 and two magnet pairs 24a,b and a back iron 32a,b for each rotor links the flux between the back of each magnet 24a,b facing away from the respective coils 22. The stator coils 16 are enclosed within a housing that extends through the air gap 26a, b and which defines a chamber supplied with a cooling medium.

Turning to FIG. 3, a stator 12a is shown in which the stator coils are located between plastic material clam shells 42a, b. These clamshells have external cylindrical walls 44, internal cylindrical walls 46, and annular radially disposed walls 48. In the prior art example of FIG. 3 the radial walls 48 include internal pockets 50 to receive the shoes 18a,b of the stator bars 16 and serve to locate the stator coil assemblies 16, 22, 18a,b when the two clam shell housings 42a, b of the stator 12a are assembled together. The stator housing 42a, b defines spaces 52 internally of the coils 22 and externally at 54 around the outside of the coils 22 and there are spaces 56 between the coils. The spaces 52,54,56 are interlinked defining a cooling chamber. Although not shown in FIG. 3, when assembled, the stator housing 42a,b is provided with ports that allow cooling medium such as oil to be pumped into the spaces 52,54,56 to circulate around the coils and cool them.

The coil cores may be laminated with the inter-lamination insulation parallel to the desired flux direction. However the coil cores may also be formed from soft-iron particles coated with electrical insulation and moulded to a desired shape (soft magnetic composites—SMC), being bound together by the insulation matrix. An example SMC may comprise glass-bonded iron particles, a thin layer (typically <10 μm) of glass bonding and mutually electrically insulating the iron particles, leaving some residual porosity. A high-temperature, high-pressure compaction process is used to mould the component into a complex shape, capable of producing three-dimensional magnetic flux patterns with an excellent form factor and enabling a high fill factor winding to be employed, wound straight onto SMC teeth. Conveniently the shoes and stator bar may be formed separately and subsequently assembled; a shoe may have a central region with an axial direction of minimum reluctance and an outer region with a radial direction of minimum reluctance (see WO2012/022974).

FIGS. 4 to 17 show the axial flux machine 100 during various stages of assembly and installation. FIG. 4a shows the machine fully assembled and installed within the structures 108, 110. FIGS. 4b and 4c show different variants of the machine assembled and installed within the structure 108 (no second structure is shown here, but may be present when fully assembled). FIGS. 5 to 8 show the machine in various states of assembly when using a first type of spacer. FIGS. 9 to 12 show the machine in various states of assembly when using a second type of spacer. With reference to FIGS. 5 to 12, when fully assembled, the machine is in a condition in which it may be transported to be installed into suitable structures (such as the arrangement shown in FIG. 4). FIG. 13 shows the installation process when using the first type of spacer. FIGS. 14 to 17 show the installation process when using the second type of spacer.

The axial flux machine 100 comprises a stator 102 and a rotor 104, which has two stages 104a, b, disposed either side of the stator 102 and axially spaced apart from the stator to provide axial air gaps. A shaft 106 extends along the axis of the machine and has first and second engagement surfaces 116a,b that enable other shafts or suitable connections to be made to the machine in order to get torque in or out of the machine when installed. The engagement surfaces 116a,b are shown as splined surfaces, although other types of engagement would be apparent to the reader, such as the bolts 136 (FIG. 4b), which affix the shaft 106 to the shaft of the structure, or the splined surfaces 138 in FIG. 4c.

The first rotor 104a and second rotor 104b are mounted on the shaft 106 such that the first and second rotors rotate in unison, and relative to the stator when fully installed. The rotors 104a,b have radial walls mounting a set of permanent magnets 118a,b. Either or both of rotors 104a,b provide a drive input/output, in the case of a generator/motor respectively, but for simplicity this is not shown in the figures.

The first and second rotors 104a,b are mounted to the shaft via, respectively, first rotor contact surface 130a and second rotor contact surface 130b. The first rotor contact surface 130a is axially positioned on the shaft 106 to define the axial position of the first rotor 104a, and the second rotor contact surface 130b is axially separated from the first rotor contact surface 130a to define the axial distance between the first and second rotors 104a,b and to define the axial airgaps between the first rotor 104a and stator 102 and the second rotor 104b and stator 102.

The stator 102 has a housing 120 comprising first and second radial walls and generally cylindrical inner and outer walls, defining a chamber within which coolant may circulate. The housing encloses a set of stator coils; these and their electrical connections are not shown for simplicity. The coils are wound around pole pieces (also not shown for simplicity).

When installed, the machine 100 is held and supported by two structures 108, 110 (although for simplicity, this second structure is not shown in FIGS. 4b and 4c). However, in an alternative arrangement, a second structure may not be required. In this alternative arrangement, a second shaft bearing (not shown) situated to the left of the bearing seen in FIGS. 4b and 4c may be used to form a cantilever bearing shaft obviating need for a supporting structure 110. In this instance a rotor cover (not shown) may be used to protect rotor 104a from the external environment.

The structure 108 has an opening to receive the second end of the shaft 106 and it's second engagement surface 116b. The structure 108, in it's opening, has radial bearings 134b seated therein. When installed, the bearings 134b are seated on the second end of the shaft 106 and rest up against the second bearing contact surface 132b. Thus the structure 108 is supported on the shaft 106 via the radial bearings 134b, and the structure 108 and/or the mount 126 may cover or enclose the second rotor 104b, which protects the rotating rotor 104b from the external environment.

The structure 108 may, for example, be a portion of an engine in a vehicle e.g. a flywheel bell housing, to which the machine 100 is to be mounted to provide torque or additional torque e.g. for starting (in the case of the machine being a motor or torque source) or to receive torque from the engine (in the case of the machine being a generator).

The machine 100 may be mounted to the structure 108 via a mount 126, which is mounted to the stator housing 120. In this arrangement, the shaft 106, and thus rotors 104a,b may rotate relative to the stator housing 120, mount 126 and the structure 108. This arrangement provides a very rigid structure, which provides correct alignment for the rotors 104a,b, stator 102 and shaft 106 and also may provide cover or enclosure to the second rotor 104b. In an alternative arrangement, the function of the separate mount 126 is provided by a suitable mount structure that is integral either with the stator housing 120 or the structure 108 and that extends from the stator housing or structure.

During the installation process (described below), it may be determined that an axial shim 140 is required in order to provide the correct position of the stator housing 120 relative to the rotors 104a,b and the structure 108. If this is the case, the shim 140 may be located in one or more of the following positions:

between the structure 108 and second radial bearing 134b;
between the second radial bearing 134b and the second radial bearing mounting surface 132b;
between the structure 108 and the mount surface of the mount 126; and
between the mount 126 and the stator housing 120

The second structure 110 has an opening to receive the first end of the shaft 106 and its first engagement surface 116a. The structure 110, in it's opening, has radial bearings 134a seated therein. When installed, the bearings 134a are seated on the first end of the shaft 106 and rest up against the first bearing contact surface 132a. Thus the structure 110 supports the shaft 106 via the radial bearings 134a, and the structure 110 may cover or enclose the first rotor 104a, which protects the rotating rotor 104a from the external environment.

The structure 110 may, for example, be a portion of a transmission system in a vehicle (such as a clutch assembly or a gearbox), to which the machine 100 is to be mounted to provide additional torque (in the case of the machine being a motor or torque source) or to receive torque from the engine (in the case of the machine being a generator).

The machine 100 may be mounted to the structure 110 via a second mount 128, which is mounted to the stator housing 120. In this arrangement, the shaft 106, and thus rotors 104a,b may rotate relative to the stator housing 120 and the structure 110. This arrangement provides a very rigid structure, and also provides correct alignment for the rotors 104a,b, stator 102 and shaft 106. Similar to the arrangement with the first mount 126 and structure 108, the function of the second mount 128 is provided by a suitable mount structure that is integral either with the stator housing 120 or the structure 110 and that extends from the stator housing or structure.

FIGS. 6 and 8 show the machine 100 in its assembled, but uninstalled form when using a first type of spacer 122, 126. The difference between FIGS. 6 and 8 are that FIG. 8 additionally shows a second spacer 126 between the second rotor and stator (which will be described later).

In the assembled, but uninstalled, form, the machine is provided in a condition in which the machine may be transported, but in which the machine 100 will not run.

With reference to FIGS. 5 to 8, which have the same reference numerals for the corresponding features in FIGS. 4 and 13, the machine 100 is provided having rotors 104a,b mounted to the shaft 106 at the respective rotor contact surfaces 130a,b. Also used in the assembly process (described below) is a spacer 122, which is provided between the first rotor 104a and the first side of the stator 102. The spacer prevents the stator 102 contacting and grounding on the first rotor 104a during transit (since the stator 102 is not fixed to any structure to prevent movement during transit). The spacer 122 is preferably thinner than the desired axial air gap of the final installed machine.

Additionally, a second spacer 124 may be provided between the second side of the stator 102 and the second rotor 104b. The second spacer 124 is provided to prevent the stator touching down on the second rotor 104b if the stator were to "hop" or move axially away from the first rotor 104a during transit prior to installation. The second spacer 124 preferably has a thickness that is greater than a desired air-gap between the second rotor and stator of the installed machine and is loosely held in place i.e. not firmly gripped or sandwiched by the second rotor 104b and second side of stator 102.

FIG. 11 shows the machine 100 in its assembled, but uninstalled form, when using a second type of spacer 122'. In the assembled, but uninstalled, form, the machine is provided in a condition in which the machine may be transported, but in which the machine 100 will not run.

With reference to FIGS. 9 to 12, which have the same reference numerals for the corresponding features in the earlier figures, the machine 100 is provided having rotors 104a,b mounted to the shaft 106 at the respective rotor contact surfaces 130a,b. Also used in the assembly process (described below) is a spacer 122', which is provided to separate the first rotor 104a and the stator 102 and to prevent the stator 102 contacting and grounding on the first rotor 104a during transit (since the stator 102 is not fixed to any structure to prevent movement during transit). The spacer 122' is attached to both the first rotor 104a and the stator housing 120 to minimise any relative motion between the two components during transit.

Method of Assembling the Machine

The YASA (Yokeless And Segmented Armature) machine 100 has a single annular stator 102 on either side of which there lies rotors 104a,b with permanent magnets 118a,b arranged with north and south poles lying parallel to the rotation axis, interacting with armature pole pieces across air gaps, one for each rotor and stator side. This arrangement balances the considerable attractive force of permanent magnet rotors towards the stator and the stator thereby receives a net attraction of close to zero. It is usual for rotor bearings to be closely associated with the motor, often within the stator such that the only load path from the rotor(s) is through the bearing held within the inner peripheral housing of the stator, which is an advantageous format that minimises stack up tolerances. In some instances left and right-hand rotor shrouds may house bearings and in either of these formats rotors are assembled on to a stator using jacking rigs to carefully control approach and placement so as to maintain the designed air-gap. Such motors when built are self-contained and may be shipped and assembled in to equipment with only the normal regard for whole motor axial alignment and motor handling.

In general the assembly of permanent magnet dynamo electric machines whether axial or of radial topology is a challenging task and requires careful consideration of how rotors and stator should be brought together so as not to damage these components and certainly to avoid touchdown of rotor on stator.

The following methods of assembly take special advantage of the unique topology of a single stator, double rotor axial flux machine enabling a simple and elegant assembly method, however with simple adjustment the assembly method may be applied to a single rotor, single stator topology.

With reference to FIGS. 5 to 8, a right-hand rotor 104a of generally annular shape with a first and second side, the first side carrying permanent magnets 118a arranged in a clockwise fashion is attached to a rotor shaft 106 at the rotor contact surface 130a.

With the right hand rotor 104a in place, a first type of spacer 122 is then applied to the permanent magnet face of the right-hand rotor 104a. Such spacer 122 may be a single component annular disc with keyhole shaped central aperture to allow removal by radial movement (see for example FIG. 7), or it may be multi-component pieces placed to provide uniform support to the rotor.

Advantageously the spacer may be marginally ferromagnetic so as to be held lightly in position when placed on the rotor carrying permanent magnets. The spacer 122 is of thickness just short (~100 microns) of the nominal stator 102 to rotor 104a airgap.

Having placed spacer 122 thereby protecting the rotor 104a from touch down by the stator 102, an annular stator 102 having a central aperture larger than the diameter of the rotor shaft 106 is jacked into place, the annular stator 102 being allowed to approach and then contact the spacer 122, which protects the right-hand rotor 104a. The spacer is firmly compressed by the stator to rotor attractive force; the spacer is made of a suitable material to fully support and not damage either the stator or the rotor.

With stator 102 and right-hand rotor 104a in place firmly sandwiching the spacer 122, which separates the rotor 104a and stator 102 from touching just short of the nominal airgap distance, the left-hand rotor 104b is jacked towards the stator 102 and is attached fixedly to the rotor shaft 106 at the second rotor contact surface 130b. The first and second rotor contact surfaces 130a,b on the rotor shaft 106 are of axial separation to accept the stator 102 and provide nominal air gaps between stator 102 and first and second rotors 104a,b.

In this format the stator is biased towards the right-hand rotor 104a and the left hand rotor 104b to stator 102 airgap is as much above nominal as the right-hand rotor to stator air-gap is below nominal. For shipping purposes to avoid the potential of jump of stator to left-hand rotor a second spacer 124 (FIG. 8) may be placed in the above nominal airgap.

The machine 100 is thus in its assembled form and suitable for transporting. Although, as described above, this machine is not in a condition to run in this form.

The assembly method of the stator 102 (not described) delivers a narrow and known tolerance on stator width such that from motor to motor a small and acceptable variation in physical air gap occurs when a stator is sandwiched between right and left-hand rotors. At this stage, it remains for the stator 102 to be centered between the rotors 104a,b to give an equal air gap between stator and either rotor, and for bearings to be provided to enable the rotors 104a,b to be able to rotate relative to the stator 102.

With reference to FIGS. 9 to 13, a right-hand rotor 104a of generally annular shape with a first and second side, the first side carrying permanent magnets 118a arranged in a clockwise fashion is attached to a rotor shaft 106 at the rotor contact surface 130a.

With the right hand rotor 104a in place, a second type of spacer 122' is then attached to the second side of the first rotor 104a, that is to the side of the first rotor that faces away from the stator 102. The spacer 122' is formed as an annulus comprising a plurality of spacing portions 150 extending radially from the outer circumference of the annulus beyond the circumferential edge of the first rotor 104a. The spacing portions 150 also extend axially towards the stator 102. The spacer 122' is attached to the rotor 104a by, for example, a plurality of spacer bolts 152. Other attachment means may be possible.

As such, the spacer 122' extends around the outer periphery of the first rotor 104a. The spacing portions 150 extend beyond the first side of the first rotor 104a by a sufficient distance to separate the stator 102 and first rotor 104a when the stator 102 is installed. The spacer 122' protects the rotor 104a from touch down by the stator 102, and keeps the rotor 104a and stator 102 in fixed distance relationship with each other during transit.

Once the spacer 122' and first rotor 104a are in place, an annular stator 102 having a central aperture larger than the diameter of the rotor shaft 106 is jacked into place, the annular stator 102 and stator housing 120 being allowed to approach and then contact the spacer 122' at the faces of the spacing portions 150. Stator housing bolts 154 are used to attach the spacer 122' and the stator housing 120. The spacer 122' is made of a suitable material to fully support and retain the first rotor 104a and stator 102 in fixed relation.

With stator 102 and right-hand rotor 104a fixed in place via the spacer 122; the left-hand rotor 104b is jacked towards the stator 102 and stator housing 120. The left-hand rotor 104b is attached fixedly to the rotor shaft 106 at the second rotor contact surface 130b. The first and second rotor contact surfaces 130a,b on the rotor shaft 106 are of axial separation to accept the stator 102 and provide nominal air gaps between stator 102 and first and second rotors 104a,b.

In this format the stator is approximately centralised between the right-hand rotor 104a and the left hand rotor 104b. However, a spacer 122' may be chosen instead to have a longer or shorter axial length in the spacer portions 150 if a different, non-centralised, position between the right and left-hand rotors is required during transit.

The machine 100 is thus in its assembled form and suitable for transporting. Although, as described above, this machine is not in a condition to run in this form.

The assembly method of the stator 102 (not described) delivers a narrow and known tolerance on stator width such that from motor to motor a small and acceptable variation in physical air gap occurs when a stator is sandwiched between right and left-hand rotors. At this stage, it remains for the stator 102 to be centered between the rotors 104a,b to give an equal air gap between stator and either rotor, and for bearings to be provided to enable the rotors 104a,b to be able to rotate relative to the stator 102.

Method of Installing the Machine

We will now describe a method of installing the assembled machine.

In its simplest form, the process of installing the machine to a structure (for example an engine or transmission components in a vehicle) comprises attaching a mount 126 to the stator housing 120 and attaching the structure to the mount 126. In attaching the structure to the stator housing 120 via the mount 126, the stator is fixed in position, and the first and second rotors need to be positioned correctly either side of the stator 102. However, the correct positioning of the stator 102 relative to the rotors 104a,b, is dependent on several components and their axial lengths and tolerances, namely the axial lengths of the structure, the mount, the stator, the distance between the first and second rotors etc. The described installation process takes these factors into account.

Referring first to FIGS. 4 and 13, in the method of installation, the shaft 106 of the machine 100, which comprises a first engagement surface 116a on a first end of the shaft for coupling torque in or out of the machine, and a second engagement surface 116b at a second end of the shaft for coupling torque in or out of the machine, is offered up to the structure 108. The structure 108 preferably comprises an opening, in which is seated a radial bearing 134b. The second end of the shaft 102 is then seated within the opening of the structure 108 such that the structure 108 is supported on the shaft 106 via the bearings 134b. The bearings 134b are seated in a position abutting the radial bearing contact surface 132b on the shaft 106.

At this stage, the shaft is preferably supported in axial alignment with the structure and at a defined axial position within the structure, since any deviation from its desired axial position and alignment during installation could result in the stator and rotors being out of alignment, which could result in a catastrophic breakdown in the machine when run. Such support could be provided by clamps or other means. Alternatively, attachment of the shaft to a second structure 110 on the first side of the shaft 106 could be used to support the shaft in axial alignment and position within the structure 108. For clarity, this step will be described later.

Once the shaft is supported, an axial shim 140 may be required in an axial path between the structure and stator housing in order to set the correct axial length along this path to get the stator to move to the correct location between the rotors. The process of selecting the correct shim thickness will be described below. The shim may be placed in the axial path between the structure 108 and the stator housing 120. For example, the shim may be placed:

between the structure 108 and second radial bearing 134b;
between the second radial bearing 134b and the second radial bearing mounting surface 132b;
between the structure 108 and the mount surface of the mount 126; and
between the mount 126 and the stator housing 120

In practice, one or more shims 140 (of known thickness) may be required in order to set the correct axial distance between the structure 108 and the stator housing 120. In a limit mount 126 maybe one and the same as shim(s) 140. By measuring one or more of the following axial lengths/distances, a desired position of the stator housing relative to the structure may be calculated, and the desired shim 140 thickness chosen:

an axial distance between the second radial bearing mounting surface and the first rotor;
an axial distance between the first and second rotor contact surfaces;
an axial distance between the second radial bearing mount surface and the second rotor contact surface;
an axial length of the structure between the surface of the second radial bearing in contact with the second radial bearing mount surface and the surface of the structure in contact with the mount surface of the mount; and
an axial distance of the mount between the mount surface and the surface of the mount in contact with the stator housing.

With the correct shim 140 in place, the mount 126 is attached to the structure 108. In doing so, given the known axial dimensions of the machine 100 and structure 108, the stator 102 is pulled away from the first rotor 104a and into a correct and desired axial position between the first and second rotors 104a,b. The spacer 122 falls loose as the stator 102 moves away from the first rotor 104a.

The machine is now installed against the structure 108, which covers and protects the second rotor 104b.

Whilst the above method of mounting the machine to the first structure 108 describes the use of a mount 126 between the stator housing 120 and the structure 108, it is also envisaged an alternative mounting scheme in which the structure 108 or the stator housing 120 is provided with an extending mount that is integral to the structure 108 or stator housing 120 respectively. In either case, the structure and stator housing are attached via this extending mounting structure as if it were the mount 126 as described above.

The second structure 110 is mounted to the machine 100 uses a similar mounting scheme to the first structure 108 in that a second mount 128 is provided between the second structure 110 and the stator housing 120. Furthermore, the second structure 110 is supported on the shaft 106 via bearings 134a, which are seated on the shaft 106 at the first radial bearing contact surfaces 132a. The second structure covers or encloses the first side of the machine 100 and the first rotor 104a, thus protecting it from the surrounding environment.

Similarly to the first structure mounting 108, the second structure 110 or the stator housing 120 may be provided with an extending mounting structure in place of the separate mount 128.

Both the first and second structure 108, 110 are rigid structures and thus provide an assembled machine that is very rigid and fully supported.

Referring now to FIGS. 14 to 17, in the method of installation, the shaft 106 of the machine 100, is offered up to the structure 108. The structure 108 preferably comprises an opening, in which is seated a radial bearing 134b, in which is seated a shaft 156. The shaft 106 is then seated on the shaft 156 such that the machine 100 is supported on the shaft 154. Of course, this is one of many different arrangements. As described with reference to FIGS. 4 and 13, instead the shaft 106 of the machine may be arranged to sit within an opening within the structure 108. In this case, a radial bearing 134b is seated within the opening, and a second end of the shaft 106 is then seated within the opening of the structure 108 such that the structure 108 is supported on the shaft 106 via the bearings 134b. The bearings 134b are seated in a position abutting the radial bearing contact surface 132b on the shaft 106 in this configuration. Other configurations are possible.

At this stage, the shafts 106 and/or 156 are preferably supported in axial alignment with the structure and at a defined axial position within the structure, since any deviation from its desired axial position and alignment during installation could result in the stator and rotors being out of alignment, which could result in a catastrophic breakdown in the machine when run. Such support could be provided by clamps or other means. Alternatively, attachment of the shaft to a second structure 110 on the first side of the shaft 106 could be used to support the shaft in axial alignment and position within the structure 108. For clarity, this step will be described later.

An axial shim 140 may be required in an axial path between the structure and stator housing in order to set the correct axial length along this path to get the stator to move to the correct location between the rotors. The process of selecting the correct shim thickness will be described below. The shim may be placed in the axial path between the structure 108 and the stator housing 120. For example, the shim may be placed:

between the structure 108 and second radial bearing 134b;
between the second radial bearing 134b and the second radial bearing mounting surface 132b;
between the structure 108 and the mount surface of the mount 126; and
between the mount 126 and the stator housing 120
between the mounting surface of the shaft 106 and the mounting surface of the shaft 156 of the structure 108

In practice, one or more shims 140 (of known thickness) may be required in order to set the correct axial distance between the structure 108 and the stator housing 120. Mount 126 maybe one and the same as shim(s) 140.

In the configuration shown in the figures, the axial shim 140 is placed between the mounting surface of the shaft 106 and the mounting surface of the shaft 156 of the structure 108. In practice, the machine 100 is shipped with a shim 140 pre-fitted, in which case the installer of the machine may add more shims 140 to the shim 140 already in place if an increase in the axial dimension is required. Or the installer may replace the pre-shipped shim 140 for a thinner shim or remove the shim altogether if the axial distance needs to be reduced.

By measuring one or more of the axial lengths/distances as described with reference to FIGS. 4 and 13, a desired position of the stator housing relative to the structure may be calculated, and the desired shim 140 thickness chosen.

With the correct shim 140 in place, the mount 126 is attached to the structure 108. In doing so, given the known axial dimensions of the machine 100 and structure 108, the stator 102 is fixed in place and the first and second rotors 104a,b are placed into a correct and desired axial position relative to the stator 102. The spacer 122' is then removed from the stator housing 120 and first rotor 104a.

The machine is now installed against the structure 108, which covers and protects the second rotor 104b.

Whilst the above method of mounting the machine to the first structure 108 describes the use of a mount 126 between the stator housing 120 and the structure 108, it is also envisaged an alternative mounting scheme in which the structure 108 or the stator housing 120 is provided with an extending mount that is integral to the structure 108 or stator housing 120 respectively. In either case, the structure and stator housing are attached via this extending mounting structure as if it were the mount 126 as described above.

As with the version of the machine shown in FIGS. 4 and 13, a second structure 110 may be mounted to the machine 100. The second structure 110 is mounted to the machine 100 as described above. When installed, the second structure covers or encloses the first side of the machine 100 and the first rotor 104a, thus protecting it from the surrounding environment.

Similarly to the first structure mounting 108, the second structure 110 or the stator housing 120 may be provided with an extending mounting structure in place of the separate mount 128.

Both the first and second structure 108, 110 are rigid structures and thus provide an assembled machine that is very rigid and fully supported.

No doubt many other effective alternatives will occur to the skilled person. It will be understood that the invention is not limited to the described embodiments and encompasses modifications apparent to those skilled in the art lying within the scope of the claims appended hereto.

The invention claimed is:

1. A method of assembling an axial flux machine comprising:
    supplying a shaft, the shaft extending along an axis of the machine and comprising first and second rotor contact surfaces for mounting first and second rotors;
    attaching a first rotor to an outer surface of the shaft at the first rotor contact surface, the first rotor comprising an annulus having a hollow central region and having a set of permanent magnets disposed circumferentially at intervals around the axis of the machine facing inward of the machine;
    applying a removable spacer to the first rotor, the removable spacer for maintaining a fixed spacing between the first rotor and a stator;
    arranging a stator co-axially with the shaft and adjacent the first rotor such that the removable spacer is contacted by a first side of the stator and the first rotor, the stator comprising a stator housing enclosing a plurality of stator bars disposed circumferentially at intervals around the axis of the machine, each of the stator bars having a set of coils wound therearound for generating a magnetic field, and the stator housing having an annular shape forming a hollow region about the axis of the machine, the shaft sitting within the hollow region of the stator; and
    attaching a second rotor to the outer surface of the shaft at the second rotor contact surface, the second rotor comprising an annulus having a hollow central region and having a set of permanent magnets disposed circumferentially at intervals around the axis of the machine facing inward of the machine, the second rotor being attached at a position of the shaft that is adjacent a second side of the stator, the second side of the stator being opposite the first side of the stator,
    wherein the first rotor contact surface is axially positioned on the shaft to define the axial position of the first rotor, and wherein the second rotor contact surface is axially separated from the first rotor contact surface to define the axial distance between the first and second rotors and to define the axial airgaps between the first rotor and stator and the second rotor and stator.

2. A method according to claim 1, wherein the removable spacer is applied to a surface of the first rotor that faces the stator, the removable spacer being formed of an annulus with a channel between the inner and outer circumferential portions for receiving the shaft.

3. A method according to claim 2, comprising applying a second removable spacer between the second surface of the stator and the second rotor.

4. A method according to claim 3, wherein the second removable spacer is formed of an annulus with a channel between the inner and outer circumferential portions for receiving the shaft.

5. A method according to claim 3, wherein the second removable spacer has an axial thickness that is greater than a desired air-gap between the second rotor and stator of the assembled machine.

6. A method according to claim 2, wherein the removable spacer in contact with the first rotor has an axial thickness that is less than a desired air-gap between the first rotor and stator of the assembled machine.

7. A method according to claim 1, wherein the removable spacer is mounted to a surface of the first rotor that faces away from the stator, the removable spacer being formed as an annulus comprising a plurality of spacing portions extending radially from the outer circumference of the annulus beyond the circumferential edge of the first rotor, the spacing portions also extending axially towards the stator, and wherein the removable spacer portions are in contact with the first side of the stator when installed.

8. A method according to claim 7, wherein the axial length of the removable spacer portions defines a gap between the stator and the rotor when installed.

9. A method according to claim 7, wherein the removable spacer is attached to the stator.

10. A method according to claim 1, wherein the rotors are attached to the shaft by push-fit, bolt or screw fixings, or hot shrink fit.

11. A method according to claim 1, comprising attaching a mount to the second side of the stator housing, the mount having a mount surface facing away from the stator housing for mounting the machine to a structure.

12. A method of installing an axial flux machine to a structure, comprising:
assembling an axial flux machine according to claim 2;
supporting the shaft in axial alignment with the structure and at an axial position relative to the structure;
attaching the second side of the stator housing to the structure; and
removing the removable spacer,
wherein the step of attaching the second side of the stator housing to the structure pulls the stator away from the first rotor such that the stator is moved axially to be centred axially between the first and second rotors.

13. A method according to claim 12, wherein the shaft of the machine comprises a first engagement surface on a first end of the shaft for coupling torque in or out of the machine, a second engagement surface at a second end of the shaft for coupling torque in or out of the machine, a first radial bearing mounting surface on the first end of the shaft and a second radial bearing mounting surface on the second end of the shaft, wherein the first end of the shaft is on the same side of the machine as the first rotor and the second end of the shaft is on the same side of the machine as the second rotor; and wherein the step of attaching the second side of the stator housing to the structure comprises:
arranging the structure on to the shaft at the second end of the shaft, the structure comprising a second radial bearing on an inner circumferential surface of a hollow portion in the structure, and the structure being supported on the shaft by the second radial bearing, the second radial bearing being seated on the shaft at the second radial bearing mounting surface;
providing an axial shim in an axial path between the structure and stator housing; and
attaching the second side of the stator housing to the structure,
wherein the axial shim has a thickness that defines an axial position of the structure relative to the stator housing such that when the structure is driven into attachment with the mount, the stator moves axially away from the first rotor to a central axial location between the first and second rotors.

14. A method according to claim 13, wherein the machine comprises a mount having a mounting surface and for mounting the stator housing and structure, the method of attaching the second side of the stator housing further comprising:
attaching the mount to the second side of the stator housing, the mounting surface facing away from the stator housing; and
attaching the mounting surface to the structure.

15. A method according to claim 13, wherein the axial shim is provided between the structure and second radial bearing, between the second radial bearing and the second radial bearing mounting surface, or between the structure and the stator housing, or, when the machine comprises a mount having a mounting surface and for mounting the stator housing and structure, the axial shim is provided between the structure and the mounting surface of the mount.

16. A method according to claim 14, wherein the step of providing an axial shim comprises:
measuring at least one axial length of a portion within the machine; and
selecting an axial shim thickness depending on the at least one measured axial length such that the step of attaching the mount to the structure causes sufficient axial movement of the stator in order to move the stator axially away from the first rotor.

17. A method according to claim 16, wherein the at least one measured axial length of a portion within the machine is one or more of:
an axial distance between the second radial bearing mounting surface and the first rotor;
an axial distance between the first and second rotor contact surfaces;
an axial distance between the second radial bearing mount surface and the second rotor contact surface;
an axial length of the structure between the surface of the second radial bearing in contact with the second radial bearing mount surface and the surface of the structure in contact with the mount surface of the mount; and
an axial distance of the mount between the mount surface and the surface of the mount in contact with the stator housing.

18. A method according to claim 12, wherein the structure covers the second rotor.

19. A method according to claim 12, comprising:
attaching the first side of the stator housing to a second structure.

20. A method according to claim 19, wherein the step of attaching the first side of the stator housing to a second structure comprises:
arranging a second structure on to the shaft at the first end of the shaft, the second structure comprising a first radial bearing on an inner circumferential surface of a hollow portion in the second structure, and the second structure being supported on the shaft by the first radial bearing, the first radial bearing being seated on the shaft at the first radial bearing mounting surface; and
attaching the second side of the stator housing to the second structure.

21. A method according to claim 20, wherein the machine comprises a second mount having a mounting surface and for mounting the stator housing and second structure, the method of attaching the first side of the stator housing further comprising:
attaching a second mount to the first side of the stator housing, the second mount having a mounting surface at an end of the second mount away from the stator housing; and
attaching the mounting surface of the second mount to the second structure.

22. A method according to claim 20, wherein the second structure covers the first rotor.

23. A method according to claim 19, wherein the second structure supports the shaft in axial alignment with the first structure and axial position in the first structure.

24. A method according to claim 12, wherein the structures comprise a portion of an engine of a vehicle or a portion of a transmission system of the vehicle.

25. A method of installing an axial flux machine to a structure, comprising:
assembling an axial flux machine according to claim 7;
supporting the shaft in axial alignment with the structure and at an axial position relative to the structure;
attaching the second side of the stator housing to the structure; and
removing the removable spacer.

26. A method according to claim 25, wherein the shaft of the machine comprises a first engagement surface on a first end of the shaft for coupling torque in or out of the machine, a second engagement surface at a second end of the shaft for coupling torque in or out of the machine, a first radial bearing mounting surface on the first end of the shaft and a second radial bearing mounting surface on the second end of the shaft, wherein the first end of the shaft is on the same side of the machine as the first rotor and the second end of the shaft is on the same side of the machine as the second rotor; and wherein the step of attaching the second side of the stator housing to the structure comprises:
arranging the structure on to the shaft at the second end of the shaft, the structure comprising a second radial bearing on an inner circumferential surface of a hollow portion in the structure, and the structure being supported on the shaft by the second radial bearing, the second radial bearing being seated on the shaft at the second radial bearing mounting surface;
providing an axial shim in an axial path between the structure and stator housing; and
attaching the second side of the stator housing to the structure,
wherein the axial shim has a thickness that defines an axial position of the structure relative to the stator housing such that when the structure is driven into attachment with the mount, the stator moves axially away from the first rotor to a central axial location between the first and second rotors.

27. A method according to claim 26, wherein the machine comprises a mount having a mounting surface and for mounting the stator housing and structure, the method of attaching the second side of the stator housing further comprising:
attaching the mount to the second side of the stator housing, the mounting surface facing away from the stator housing; and
attaching the mounting surface to the structure.

28. A method according to claim 26, wherein the axial shim is provided between the structure and second radial bearing, between the second radial bearing and the second radial bearing mounting surface, or between the structure and the stator housing, or, when the machine comprises a mount having a mounting surface and for mounting the stator housing and structure, the axial shim is provided between the structure and the mounting surface of the mount.

29. A method according to claim 26, wherein the step of providing an axial shim comprises:
measuring at least one axial length of a portion within the machine; and
selecting an axial shim thickness depending on the at least one measured axial length such that the step of attaching the mount to the structure causes sufficient axial movement of the stator in order to move the stator axially away from the first rotor.

30. A method according to claim 29, wherein the at least one measured axial length of a portion within the machine is one or more of:
an axial distance between the second radial bearing mounting surface and the first rotor;
an axial distance between the first and second rotor contact surfaces;
an axial distance between the second radial bearing mount surface and the second rotor contact surface;
an axial length of the structure between the surface of the second radial bearing in contact with the second radial bearing mount surface and the surface of the structure in contact with the mount surface of the mount; and
an axial distance of the mount between the mount surface and the surface of the mount in contact with the stator housing.

31. A method according to claim 25, wherein the structure covers the second rotor.

32. A method according to claim 25, comprising:
attaching the first side of the stator housing to a second structure.

33. A method according to claim 32, wherein the step of attaching the first side of the stator housing to a second structure comprises:
arranging a second structure on to the shaft at the first end of the shaft, the second structure comprising a first radial bearing on an inner circumferential surface of a hollow portion in the second structure, and the second structure being supported on the shaft by the first radial bearing, the first radial bearing being seated on the shaft at the first radial bearing mounting surface; and
attaching the second side of the stator housing to the second structure.

34. A method according to claim 33, wherein the machine comprises a second mount having a mounting surface and for mounting the stator housing and second structure, the method of attaching the first side of the stator housing further comprising:
attaching a second mount to the first side of the stator housing, the second mount having a mounting surface at an end of the second mount away from the stator housing; and
attaching the mounting surface of the second mount to the second structure.

35. A method according to claim 33, wherein the second structure covers the first rotor.

36. A method according to claim 33, wherein the second structure supports the shaft in axial alignment with the first structure and axial position in the first structure.

37. A method according to claim 25, wherein the structures comprise a portion of an engine of a vehicle or a portion of a transmission system of the vehicle.

38. An axial flux machine mounted to separate structures comprising:
a stator comprising a stator housing enclosing a plurality of stator bars disposed circumferentially at intervals around an axis of the machine, each of the stator bars having a set of coils wound therearound for generating a magnetic field, and the stator housing having an annular shape forming a hollow region about the axis of the machine;

a first rotor comprising a set of permanent magnets and mounted for rotation about the axis of the machine, the rotor being spaced apart from the stator along the axis of the machine to define a gap between the stator and rotor and in which magnetic flux in the machine is generally in an axial direction, and the rotor formed of an annulus and having a hollow central region about the axis of the machine;

a second rotor disposed on an opposite side of the stator to the first rotor, the second rotor comprising a set of permanent magnets on a first side of the second rotor facing the stator, the second rotor being mounted for rotation about the axis of the machine and relative to the stator, the second rotor being spaced apart from the stator along the axis of the machine to define an axial gap between the stator and second rotor and in which magnetic flux in the machine is generally in an axial direction;

a shaft extending along the axis of the machine and comprising first and second rotor contact surfaces on respective first and second ends of the shaft, the first and second rotors being mounted respectively to the first and second rotor contact surfaces on respective first and second ends of the shaft, and the shaft comprising a first bearing mounting surface for a radial bearing on the first end of the shaft and a second bearing mounting surface for a radial bearing on the second end of the shaft;

wherein a first structure is arranged around the second end of the shaft and attached to the stator housing, the first structure comprising a radial bearing on an inner circumferential surface of a hollow portion in the first structure, and the first structure supporting the second end of the shaft by the radial bearing, the radial bearing of the first structure being seated on the shaft at the second bearing mounting surface; and wherein a second structure is arranged around the first end of the shaft and attached to the stator housing, the second structure comprising a radial bearing on an inner circumferential surface of a hollow portion in the second structure, and the second structure supporting the first end of the shaft by the radial bearing, the radial bearing of the second structure being seated on the first end of the shaft at the first bearing mounting surface; and wherein the first and second structures comprise a portion of a vehicle engine or a portion of a vehicle transmission.

39. A machine according to claim 38, comprising a mount between the second side of the stator housing and the structure, wherein the mount comprises a mounting surface facing away from the stator housing, and wherein the structure is mounted to the mounting surface of the mount, and the second side of the stator housing is mounted to the mount.

40. A machine according to claim 38, comprising an axial shim between the first structure and radial bearing in the first structure, between the radial bearing in the first structure and the second bearing mounting surface, or between the mount and the stator housing, or, when the machine comprises a mount having a mounting surface and for mounting the stator housing and first structure, the axial shim is provided between the first structure and the mount surface of the mount.

41. A machine according to claim 40, wherein the axial shim has a thickness that defines an axial position of the structure relative to the stator housing.

42. A machine according to claim 38, wherein the first rotor contact surface is axially positioned on the shaft to define the axial position of the first rotor, and wherein the second rotor contact surface is axially separated from the first rotor contact surface to define the axial distance between the first and second rotors and to define the axial airgaps between the first rotor and stator and the second rotor and stator.

43. A machine according to claim 38, wherein the structure covers the second rotor.

44. A machine according to claim 38, comprising a second mount between the first side of the stator housing and the second structure, wherein the mount comprises a mounting surface facing away from the first side of the stator housing, and wherein the second structure is mounted to the mounting surface of the second mount, and the first side of the stator housing is mounted to the mount.

45. A machine according to claim 38, wherein the second structure covers the first rotor.

46. A machine according to claim 38, wherein the structures comprise a portion of an engine of a vehicle or a portion of a transmission system of the vehicle.

47. An axial flux machine comprising:

a stator comprising a stator housing enclosing a plurality of stator bars disposed circumferentially at intervals around an axis of the machine, each of the stator bars having a set of coils wound therearound for generating a magnetic field, and the stator housing having an annular shape forming a hollow region about the axis of the machine;

a first rotor comprising a set of permanent magnets and mounted for rotation about the axis of the machine, the rotor being spaced apart from the stator along the axis of the machine to define a gap between the stator and rotor and in which magnetic flux in the machine is generally in an axial direction, and the rotor formed of an annulus and having a hollow central region about the axis of the machine;

a second rotor disposed on an opposite side of the stator to the first rotor, the second rotor comprising a set of permanent magnets on a first side of the second rotor facing the stator, the second rotor being mounted for rotation about the axis of the machine and relative to the stator, the second rotor being spaced apart from the stator along the axis of the machine to define an axial gap between the stator and second rotor and in which magnetic flux in the machine is generally in an axial direction;

a shaft extending along the axis of the machine and comprising first and second rotor contact surfaces, the first and second rotors being mounted respectively to the first and second rotor contact surfaces;

a removable spacer for maintaining a fixed spacing between the first rotor and stator;

wherein the first rotor contact surface is axially positioned on the shaft to define the axial position of the first rotor, and wherein the second rotor contact surface is axially separated from the first rotor contact surface to define the axial distance between the first and second rotors and to define the axial airgaps between the first rotor and stator and the second rotor and stator.

48. A machine according to claim 47, wherein the removable spacer is between the first rotor and first side of the stator and in contact with the first rotor and first side of the stator, the removable spacer being formed of an annulus with a channel between the inner and outer circumferential portions for receiving the shaft.

49. A machine according to claim 48, comprising a second removable spacer between the second rotor and the second side of the stator.

50. A machine according to claim 49, wherein the second removable spacer has an axial thickness that is greater than a desired air-gap between the second rotor and stator of the assembled machine.

51. A machine according to claim 49, wherein the removable spacer in contact with the first rotor has an axial thickness that is less than a desired air-gap between the first rotor and stator of the assembled machine.

52. A machine to claim 47, wherein the removable spacer is mounted to a surface of the first rotor that faces away from the stator, the removable spacer being formed as an annulus comprising a plurality of spacing portions extending radially from the outer circumference of the annulus beyond the circumferential edge of the first rotor, the spacing portions also extending axially towards the stator, and wherein the removable spacer portions are in contact with the first side of the stator when installed.

53. A machine according to claim 52, wherein the axial length of the removable spacer portions defines a gap between the stator and the rotor when installed.

54. A machine according to claim 52, wherein the removable spacer is attached to the stator.

55. A machine according to claim 47, comprising a mount to the second side of the stator housing, the mount having a mount surface facing away from the stator housing for mounting the machine to a structure.

56. A machine according to claim 47, wherein the first and/or second engagement surfaces comprise splines for engagement with respective shafts.

57. A machine according to claim 47, wherein the stator housing defines a chamber incorporating cooling medium in contact with the coils to cool the coils, the stator housing including a port for supply and a port for drainage of the cooling medium.

58. A machine according to claim 47, wherein the machine is a motor or generator.

* * * * *